United States Patent
Bazoberry Schmidt et al.

(10) Patent No.: US 12,367,505 B1
(45) Date of Patent: *Jul. 22, 2025

(54) INTERACTIVE MAP INTERFACE INCORPORATING CUSTOMIZABLE GEOSPATIAL DATA

(71) Applicant: Intercontinental Exchange Holdings, Inc., Atlanta, GA (US)

(72) Inventors: Luciana Carina Bazoberry Schmidt, New York, NY (US); Andrew Castellani McSween, Chicago, IL (US); Jason Michael Jasinek, Elk Grove Village, IL (US); Albert Penmelton Mendall, III, Hayward, CA (US); Marc Carl Batten, San Jose, CA (US); Bojan Kaljevic, Belgrade (RS); Mihailo Vasiljević, Belgrade (RS); Vladimir Nikic, Valjevo (RS); Scott Patrick Dawson, Trumansburg, NY (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/943,054

(22) Filed: Nov. 11, 2024

Related U.S. Application Data

(63) Continuation of application No. 18/602,345, filed on Mar. 12, 2024, now Pat. No. 12,175,485.

(51) Int. Cl.
*G06F 3/048* (2013.01)
*G06F 3/04817* (2022.01)
(Continued)

(52) U.S. Cl.
CPC ..... *G06Q 30/0202* (2013.01); *G06F 3/04817* (2013.01); *G06F 3/0486* (2013.01)

(58) Field of Classification Search
CPC ............ G06Q 30/0202; G06F 3/04817; G06F 3/0486
See application file for complete search history.

(56) References Cited

U.S. PATENT DOCUMENTS

| 8,768,816 B2 | 7/2014 | Brumfield et al. |
| 8,798,965 B2 | 8/2014 | Quan et al. |

(Continued)

FOREIGN PATENT DOCUMENTS

| CA | 3 114 445 C | 12/2023 |
| CN | 102308320 A | 1/2012 |
| CN | 107368925 A | * 11/2017 |

OTHER PUBLICATIONS

Kulawiak, Marcin, et al., "A Web-GIS Tool for Diagnosing Spatial Orientation of Young Adults: Design and Evaluation of Geo-Survey," http://www.nature.com/articles/s41598-023-45268-z, Scientific Reports, 2023.

(Continued)

*Primary Examiner* — Rashawn N Tillery
(74) *Attorney, Agent, or Firm* — DLA Piper LLP (US)

(57) ABSTRACT

A data distribution system configured to receive market data from one or more market data sources, associated location data from one or more location data sources, and polygons from one or more polygon sources. The system may normalize the location data and the polygons such that a format of the normalized location data matches a format of the normalized polygons. Upon receiving, via an interactive graphical user interface (GUI), user input comprising a data request, the interactive GUI may determine that the data request comprises at least a portion of the normalized location data. The interactive GUI may augment the normalized location data with one or more normalized polygons, generate an augmented presentation package comprising the one or more normalized polygons, and display the (Continued)

augmented presentation package, such that the one or more normalized polygons are presented on an interactive map interface.

30 Claims, 17 Drawing Sheets

(51) Int. Cl.
*G06F 3/0486* (2013.01)
*G06Q 30/0202* (2023.01)

(56) References Cited

U.S. PATENT DOCUMENTS

| | | | |
|---|---|---|---|
| 11,170,390 B2 | 11/2021 | Mitchell et al. | |
| 11,423,484 B2 | 8/2022 | Mitchell et al. | |
| 11,854,025 B1 | 12/2023 | Rokosz | |
| 2003/0088362 A1 | 5/2003 | Melero et al. | |
| 2006/0010030 A1* | 1/2006 | Sorensen | G06Q 30/02 |
| | | | 705/7.33 |
| 2006/0195346 A1 | 8/2006 | Tommey | |
| 2008/0172288 A1* | 7/2008 | Pilskalns | G06Q 30/0273 |
| | | | 705/14.69 |
| 2008/0301092 A1 | 12/2008 | Jayanti et al. | |
| 2013/0066682 A1* | 3/2013 | Godshalk | G06Q 10/063 |
| | | | 705/7.34 |
| 2013/0073389 A1 | 3/2013 | Heath | |
| 2013/0073400 A1 | 3/2013 | Heath | |
| 2014/0032261 A1* | 1/2014 | Kotak | G06Q 30/02 |
| | | | 705/7.29 |
| 2014/0244674 A1 | 8/2014 | Mollis et al. | |
| 2015/0026083 A1 | 1/2015 | Paliwal et al. | |
| 2016/0040996 A1 | 2/2016 | Skillman et al. | |
| 2016/0274781 A1* | 9/2016 | Wilson | G06F 16/58 |
| 2016/0364740 A1* | 12/2016 | Parker | G06Q 10/105 |
| 2017/0052747 A1* | 2/2017 | Cervelli | G06T 11/001 |
| 2017/0091795 A1* | 3/2017 | Mansour | G06Q 30/0205 |
| 2017/0124266 A1* | 5/2017 | Hasan | G06Q 10/02 |
| 2018/0075327 A1 | 3/2018 | Rubinton et al. | |
| 2018/0365354 A1* | 12/2018 | Braghin | G06F 40/30 |
| 2019/0272434 A1* | 9/2019 | Dorum | G06V 10/50 |
| 2020/0057555 A1* | 2/2020 | Walkin | G06F 3/0483 |
| 2020/0351902 A1* | 11/2020 | Athlur | H04W 4/027 |
| 2022/0019337 A1* | 1/2022 | Natali, Jr. | G06F 3/04817 |
| 2022/0108507 A1* | 4/2022 | Degtyar | G06F 3/04817 |
| 2024/0401465 A1* | 12/2024 | Sureka | G06F 16/248 |

OTHER PUBLICATIONS

European Search Report dated Mar. 17, 2025, of counterpart European Application No. 25155986.0.

* cited by examiner

INTERACTIVE MAP INTERFACE INCORPORATING CUSTOMIZABLE GEOSPATIAL DATA

TECHNICAL FIELD

The present disclosure generally relates to improving data structure integration and distribution and, in particular to distribution systems, interactive graphical user interfaces (GUIs), and methods for the integration of disparate data structures for interaction in an interactive map interface, including real-time integration of user-customizable data structures having geospatial (e.g., location) qualities.

BACKGROUND

Problems exist in the field of digital distribution platforms. In general, a digital distribution platform may manage digital data content (e.g., digital goods, digital information, etc.) and distribute the content to various end-users. Conventional platforms may distribute digital data content from one or more data sources (e.g., data feeds, data files, user input and the like) that may be distributed across one or more networks, may include different data types, different data formats, different data communication requirements, different network security, different availability time periods, and the like. Moreover, distribution platforms may distribute data content in one or more distribution formats (e.g., in a data file, graphically on a user interface, in a spreadsheet and the like), to particular end-users with varying amounts of data and/or personalized data and the like. Conventional platforms also exist that may provide the ability for user-interaction with the distributed data (e.g., data analysis tools, actions that may be performed with the data, and the like) in addition to the presentation of distributed digital data content.

All of the above variables associated with data distribution make it technically difficult to manage data distribution and interaction for real-time distribution. For example, it may become increasingly technically difficult for a distribution platform to continually update an interactive user interface with the most up-to-date data content, when the data volume increases and/or the data content itself changes rapidly. In such instances, any transmission delays over one or more networks to obtain the data content coupled with any data handling delays by the distribution platform for handling the received data content (e.g., to convert a data format of received data content, to normalize any data content, to remove any data content not suitable for presentation, to generate data for distribution in one or more distribution formats, create aggregated output data, generate any user interfaces and the like) may introduce significant errors in distributed data and the ability by the end-user to interact with the distributed content.

Another significant technical problem that still exists in data distribution platforms includes the integration of data content for distribution that includes disparate data types, where each data type may have its own unique identifier, history and attributes. For example, while it may be possible to simply display disparate data types on a user interface side-by-side, it may be difficult to integrate disparate data types in an intelligent manner, e.g., where the integration of the disparate data types provides meaningful information about the combination of disparate data types. It may be still more difficult to integrate disparate data types with real-time, rapidly changing data.

Accordingly, there is a need for a system (including a novel interactive GUI), and method for integrating and distributing disparate data types in a fully-automated (or near fully-automated) manner. There is also a need for systems and methods to provide disparate data in a manner that is customizable by the user, for improved usability. All of this, without significant increases to the computational burden, cost, system complexity, re-programming requirements and system maintenance.

SUMMARY

Aspects of the present disclosure relate to methods and systems for the integration of disparate data structures including real-time integration of physical asset (e.g., market data) having inherent geospatial (i.e., location) qualities for display and interaction on an interactive map interface. A data distribution system comprising a processing device and a memory storing computer-readable instructions, may receive market data from one or more market data sources and associated location data from one or more location data sources via a network. The data distribution system may receive polygons from one or more polygon sources. The data distribution system may normalize the location data and the polygons such that a format of the normalized location data matches a format of the normalized polygons. The data distribution system may store the normalized location data and the normalized polygons. The data distribution system may generate an initial presentation package comprising the normalized location data and the market data. The data distribution system may transmit the initial presentation package to an interactive graphical user interface (GUI) comprising an interactive map interface. The interactive GUI may display the initial presentation package. The interactive GUI may receive user input comprising a data request. The interactive GUI may determine that the data request comprises at least a portion of the normalized location data. The interactive GUI may augment the normalized location data with one or more normalized polygons among the stored normalized polygons. The interactive GUI may generate, an augmented presentation package comprising the one or more normalized polygons. The interactive GUI may display the augmented presentation package, such that the one or more normalized polygons are presented on the interactive map interface.

BRIEF DESCRIPTION OF DRAWINGS

Other objects and advantages of the present disclosure will become apparent to those skilled in the art upon reading the following detailed description of exemplary embodiments and appended claims, in conjunction with the accompanying drawings, in which like reference numerals have been used to designate like elements, and in which:

Figure 1:
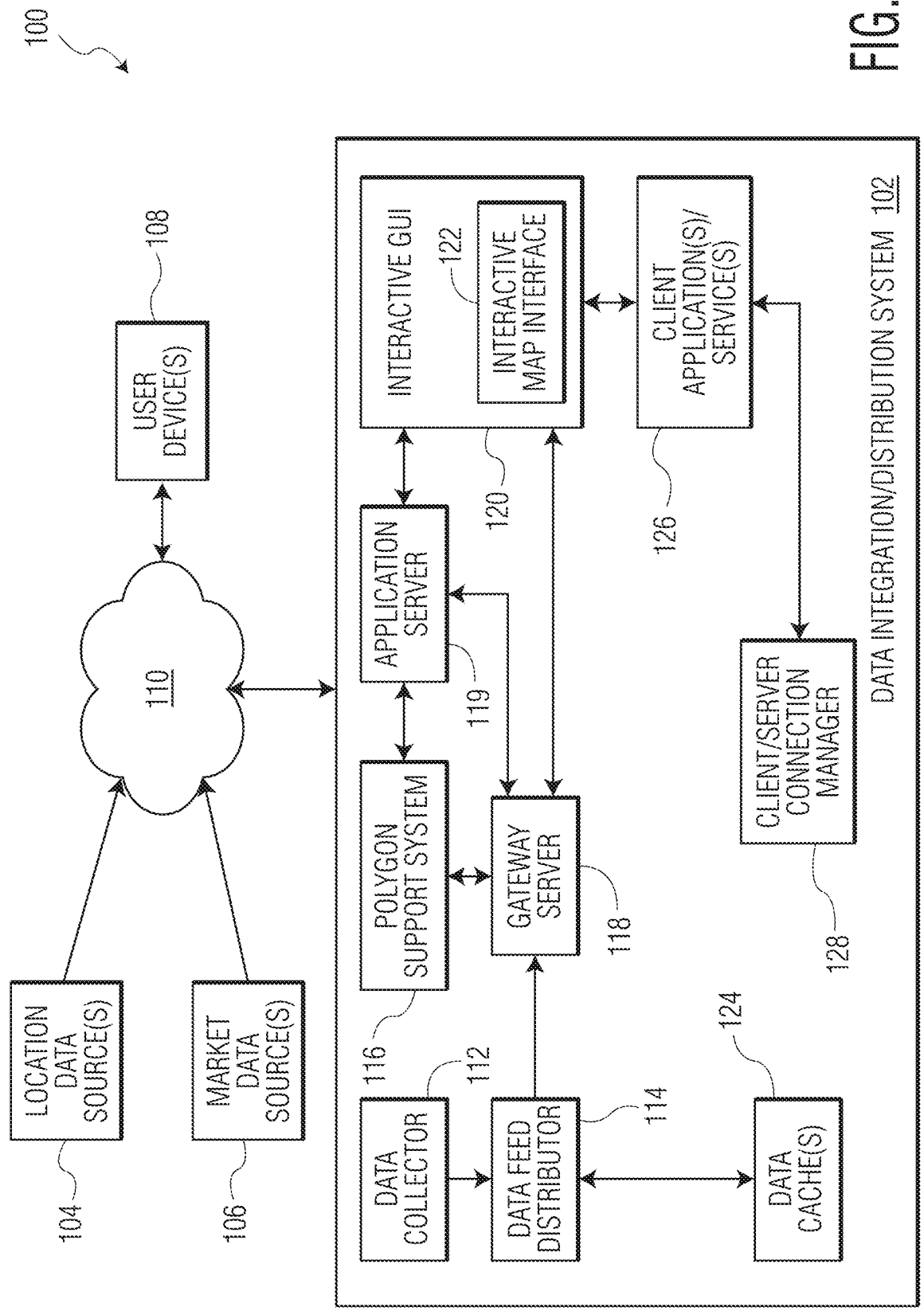
FIG. 1 is a functional block diagram of an example data distribution environment, according to an aspect of the present disclosure.

The figures are for purposes of illustrating example embodiments, but it is understood that the present disclosure is not limited to the arrangements and instrumentality shown in the drawings.

DETAILED DESCRIPTION

As discussed above, problems exist in the integration and distribution of disparate data types, including in a fully-automated (or near fully-automated) manner. One such non-limiting combination of disparate data types involves physical assets (e.g., market data) and their inherent geospatial (i.e., location) qualities. These qualities can represent risk (climate or jurisdictional), distance or transportation costs, size and shape, and impact from adjacent events. Each of these disparate data types may include historical data values, current (e.g., streaming/live) data values and/or future (e.g., predicted or forecasted) data values.

Each of these disparate data types also rely on underlying data and information that may be rapidly changing. Yet further, these disparate data types involve large volumes of data. For example, market data typically involves tens, if not hundreds, of thousands of live indications available to display at any given time, and where changes to market data may occur hundreds, if not thousands of times in a second.

Natural resource data may involve ever-changing current availability, consumption information, as well as forecasted availability, by geographic location (e.g., country, state, and local, scale). Similarly, commodities data may involve continually changing import and export data from among a large number of locations (e.g., on a global scale, on a country-level scale, on a state-level scale, etc.), as well as production forecast data that may include a number of different models that may be updated at different intervals.

Market data, such as market price data, may be accessed in watchlists, data tables, data grids, spreadsheets (e.g., Microsoft® Excel® via real time data (RTD) links embedded into Excel), as well as interactive charts. These are basic functions of many conventional trading desktops (e.g., trading desktops provided by Bloomberg, Refinitiv™ (e.g., Eikon™), Global View, DTN Exchange® and others) within the electronic financial trading community. These trading desktops were born in the 1980's and continue to evolve into highly specialized tools, designed to instantly display market data (using a time series server-based technology) which was optimized for data delivery speed for viewing and interacting with market price data. Some conventional systems support plotting real-time market prices in real-time with updating charting tools.

Similarly, location data may involve continually changing observations from among a large number of locations (e.g., on a global scale, on a country-level scale, on a state-level scale, etc.), which may be updated at different update intervals and be visualized in different ways. All of the above variables make it technically difficult to manage data aggregation, presentation and real-time comparative analysis of disparate datasets. Indeed, because of the myriad of market datasets, it becomes further technically difficult to provide one solution that is capable of integrating these data types in an intelligent and meaningful manner, let alone intelligently integrate these data types in a manner that allows for user-customization of aggregated data.

Traditionally, location data has been represented in a tabular view. However, from a data analysis tool perspective, the ability of a system/tool that is capable of aggregating and making these data values available in a user friendly and meaningful format where the data can be presented and charted over time is highly beneficial. Accordingly, one advantage of the present disclosure are the systems and methods (i.e., software workflows) that are configured to and capable of aggregating these disparate datasets, mapping them according to user-defined (user-customizable) and product defined aggregations, and distributing them via an interface such that the dataset can be manipulated for further insights.

Displaying this information integrated with the market data on a map allows for a more accurate and efficient assessment of these assets. When data is displayed by its location, one can notice geographic patterns and effectively sort information two-dimensionally. Maps enhance the processing of information to correctly assign value and risk and benefit the wider market with improved efficiencies.

Many diverse types of data can be compared using a map, such as (without being limited to) real-time market prices, news, energy, agriculture, weather, economic data (e.g., population, income, education level), fundamental data, reference data, and asset risk assessments. The examples described herein allow users to visualize and analyze this information geospatially and helps them make informed decisions in a variety of financial markets across all asset types. A key benefit is that when data is displayed on a map format, users can identify trends, patterns and relationships that would otherwise be obscure when looking at the same data in a tabular format.

In the systems described herein, users may have complete control over every set of identifiers (e.g., layers) they add to one or more maps. Using features only capable through the novel GUI (e.g., drag and drop of data sets from neighboring windows), users can easily and efficiently create mapped data sets and define behaviors on the map across any data aspect of the datapoint. For example, users may be able to pull in data locations and assign colors for different values. Because any set of data can be accessed by any UI control, users may have flexibility to define custom sets of datapoints and the associated behavior on the map. Although "prebuilt" maps may be provided to users (e.g., to highlight common views and different functionality), the flexibility for users to define the map from the ground up across an entire geospatial library is unique.

The mapping functionality and GUI described herein may interact with other widgets in an overall trading platform as both a broadcaster and receiver. When datapoints selected in a broadcast widget are also present in the map, the map may automatically zoom in towards the corresponding point. Similarly, as a broadcast, if a point or polygon is selected in the map GUI, other windows (e.g., charts and data tables) may automatically populate with data (e.g., historical data) for that datapoint. These automatic updates may occur in real time as items are selected by a user.

The mapping functionality and GUI is configured to be scalable, highly customizable, and provide real time data updates and history of prior values. These features may allow users to: create custom bespoke views across any and all asset classes and data types; interact and consume data driven from a geospatial broadcast window; view causal and correlative relationships over time; and identify locational mispricing and broad sources of risk.

In some examples, geospatial data (e.g., streaming and/or static data) may be augmented using novel processes of the present disclosure, which allows the location data (live and/or historical data) to flow seamlessly through a trading desktop (e.g., for interactive presentation on a GUI), as well as for providing location data to external systems (e.g., for further analysis, visualization, etc.). The present disclosure is unique in that it allows users to organize location data in nearly any possible (user-customizable) manner. The present disclosure allows users of a trading desktop to review location data in conjunction with market data as well as combine any element of location data with any granular element of market data.

The data integration systems and interactive GUIs of the present disclosure provide users with unique advantages, including indicating precisely how changing location data may directly influence, for example, market prices. The integration system may provide various maps, location data, and various value-analytics.

In some examples, the data integration system of the present disclosure may be configured to convert extremely large streams of market data and location data into actionable knowledge, including in a manner that is faster than conventional systems, and provides improved technical features including improved data speed, reliability, comprehensive data, a unique interactive display that does not exist outside of the present disclosure and unique transformative workflows.

In some examples, the data integration system may be configured to provide a data speed to ingest, process, and deliver (e.g., raw) location data to users, in both data and map formats with low latency. In some examples, the data integration system may provide improved reliability of location data, including the ability to acquire, render and transmit (raw) location data in a low latency fashion into various types of delivery mechanisms. In some examples, the data integration system may provide comprehensive location data, by using high (including highest) resolution data and accurate (including most accurate) data versions, of the most critical location data, as well as an enhanced temporal and spatial resolution.

In some examples, the data integration system of the present disclosure may augment location data to be displayed as "layers." The layers may be configured to break down location data into building blocks, allowing users to instantly and easily interact with both location and market data (e.g., through time and space). In some examples, the layers allow users to create any spatial display imaginable, or easily replicate a favorite display from another source. In some examples, the data integration system may provide transformative workflows, which may provide an improved speed of understanding the impact of location including on market data. The workflows may leverage the layers and improved data speed, together with the full power of an electronic trading desktop, to create unique displays that allow users to more quickly and more precisely understand how changes in location may directly influence market prices. The unique displays of the present disclosure transform how market prices interact with location data in the financial community. The displays of the present disclosure allow users to convert more location and market data into actionable knowledge, and in a manner that is faster than conventional systems.

The data integration system of the present disclosure is also unique in that it fully integrates two unique workflows (market data and location data, an example of disparate data structures) that are conventionally handled in a completely separate manner, because conventional systems were unable to integrate the two streaming workflows due to the technical complexities of the location and market workflows. Instead, at best, some conventional trading desktops may simply provide access to location data (e.g., via tabular views) but cannot provide integrated location and market data (e.g., location data overlaid with market data) in a graphical map display. The data integration system of the present disclosure (including the end-to-end infrastructure) is the first and only data integration system of its kind. In some examples, the data integration system may provide opportunities to scale electronic trading operations geared to leverage changing geospatial perspectives across many different asset classes, and may provide unique displays that improve identification of trading opportunities, including faster identification of trading opportunities.

In some examples, the data integration system may provide an improved speed of understanding of location data and market data. The unique workflows allow users to make more informed and faster decisions. The same centralized workflows may easily allow a user to scale this unique process across an electronic trading floor and across electronically traded instruments, thereby allowing each trader to monitor multiple traded markets more easily, as it relates to changing geospatial perspectives (e.g., with greater accuracy and faster speed).

In some examples, the data integration system may leverage the augmented location data combined with streaming market price data (e.g., market data stream(s)) together with a trading desktop functionality to create an almost limitless combination of elements (e.g., polygons, layers) to provide unique interactive GUIs, client applications, client services and trading desktop applications. In some examples, the data integration system may treat location data like a traded instrument that may be entered directly into a chart, table, watchlist, etc. to view the location data directly. In some examples, the location data may be configured to operate in trading desktops, spreadsheet applications and with one or more object-oriented programming languages (e.g., Java, Python™, etc.).

In some examples, the underlying location data may be accessed in real-time using the augmented elements, and the data integration system may be configured to leverage both streaming location data and streaming price data inside an electronic financial desktop.

The data integration system of the present disclosure may allow users to drag and drop data identifiers directly into an interactive map. Data identifiers from the interactive map may also be dragged and dropped directly into other windows (e.g., charts, tables, etc.). Users may be able to search across all datasets within a specific region of the interactive map, create dataset-specific map layers, set up dataset-specific layer preferences defaults, and/or customize map layers, such as (without being limited to): layer type (e.g., static or moving points, clusters, polygons, lines, grids, hexbins, heatmaps), color, opacity, shape, size, tooltip fields (e.g., defining data that gets displayed when a user hovers over a data point shown in the interactive map), and history.

The data integration system of the present disclosure may support the presentation/analysis of different data types in a single interactive map (e.g., pricing, fundamentals, weather, pipeline points, news, etc.). The interactive map may broadcast identifier data to other windows/programs (e.g., clicking on a point in the interactive map may send the point data to a linked chart). The interactive map may receive identifier data from other windows/programs. Users may be able to save customized maps for later use and import/export maps for sharing.

The present disclosure will now be described more fully hereinafter with reference to the accompanying drawings, which form a part hereof, and which show, by way of non-limiting illustration, certain examples. Subject matter may, however, be described in a variety of different forms and, therefore, covered or claimed subject matter is intended to be construed as not being limited to any examples set forth herein. Among other things, subject matter may be described as methods, devices, components, or systems. Accordingly, examples may take the form of hardware, software, firmware, or any combination thereof (other than software per se). The following detailed description is, therefore, not intended to be taken in a limiting sense.

Although disclosed principles are described with reference to disparate datasets associated with physical assets (e.g., market data), it should be understood that these principles may apply to any types of disparate data associated with location data, systems that process disparate data and interactive GUIs that are configured to display disparate data in a map format. Accordingly, the disclosed principles are not limited to disparate datasets associated with physical asset data.

Referring now to FIG. 1, a functional block diagram of an example data distribution environment 100 (environment 100 herein) is shown. Environment 100 may include data integration/distribution (DID) system 102, one or more location data sources 104, one or more market data sources 106 and one or more user devices 108 (associated with at least one user). In some examples, one or more components of environment 100 (e.g., DID system 102, one or more location data sources 104, one or more market data sources 106, and/or user device(s) 108) may be communicatively coupled via one or more networks 110. Network(s) 110 may include, for example, a private network (e.g., a local area network (LAN), a wide area network (WAN), intranet, etc.) and/or a public network (e.g., the Internet).

Market data source(s) 106 may include, in general, any electronic source for market data (e.g., price data and/or trade-related data associated with one or more tradeable financial instruments). Non-limiting examples of types of market data that may be provided by market data source(s) 106 may include one or more of equities data, derivatives data, data associated with one or more indices, market depth data, energy market data, fundamental data, inter-dealer broker (IDB) data and over-the-counter (OTC) market data. In some examples, market data source(s) 106 may also include one or more news sources that may provide information associated with market data (e.g., observations on market data trends, news stories that may affect market data and the like). In some examples, fundamental data may include one or more sources which contain structured and/or non-structured data which may provide information associated with market data impacting supply, demand and/or transportation (such as shipping data, electricity emissions, natural gas pipeline flows, etc.). In general, market data source(s) 106 that may be in communication with DID system 102 may comprise a server computer, a desktop computer, a laptop, a smartphone, or any other electronic device known in the art configured to capture data, receive data, store data and/or disseminate any suitable market data.

The one or more location data sources 104 and the one or more market data sources 106 may be collectively referred to as data feeds. The data feeds may include variety of applications that receive real-time instruments (e.g., stocks, bonds, vessels, NatGas pipelines, etc.) data from hundreds of sources from around the globe.

While shown as separate components, the one or more location data sources 104 and the one or more market data sources 106 may be part of a same data feed. For example, location data associated with various instruments may be delivered as part of a feed's real-time updates for each instrument. For example, an update for the price of natural gas on a NatGas pipeline may also include the location data (e.g., country name, state name, county name, city name, weather forecast, weather observations) associated with that pipeline link. Updates for a corporation may include the location of the corporation's headquarters. Updates for a transport vessel (e.g., planes, ships, trucks, vans, vehicles, etc.) may include the real-time latitude and longitude ("lat-long") location of the transport vessel. In addition, the location data may include information about, such as (without being limited to) one or more of electricity grids (e.g., power stations, transmission lines, green energy capture points, etc.), ports, airports, transit hubs, natural resources (e.g., mines, deposits, forests, etc.), bodies of water (e.g., lakes, reservoirs, etc.) and geographical features.

User device(s) 108 may include, without limit, any combination of mobile and/or stationary communication device such as mobile phones, smart phones, tablets computers, laptop computers, desktop computers, server computers or any other computing device configured to capture, receive, store and/or disseminate any suitable data. In some examples, user device(s) 108 may include one or more external computer systems configured to receive location and/or market data as processed by DID system 102, and may provide additional analysis, user interaction and/or distribution functionality. In one embodiment, user device(s)

108 may include a non-transitory memory, one or more processors including machine readable instructions, a communications interface which may be used to communicate with DID system 102, a user input interface for inputting data and/or information to user device(s) 108 and/or a user display interface for presenting data and/or information on user device(s). User device(s) 108 may also be configured to provide interactive GUI 120 of DID system 102 on the GUI of user device(s) 108. In some examples, user device(s) 108 may include computer system 800 (shown in FIG. 8).

DID system 102 may include data collector 112, data feed distributor 114, polygon support system 116, gateway server 118, application server 119, interactive GUI 120, one or more data caches 124, one or more client applications and/or services 126, and client/server connection manager 128. In some examples, the one or more components 112-128 of DID system 102 may communicate with each other via a data and control bus (not shown). Although DID system 102 is shown in FIG. 1 as one component (e.g., a server), DID system 102 may include one or more components (e.g., one or more servers), whether co-located or linked across one or more networks.

Although not shown, DID system 102 may include at least one processor (e.g., processing device 802 shown in FIG. 8) and non-transitory memory (e.g., memory 806 shown in FIG. 8) storing one or more routines and or algorithms for performing the functions of DID system 102 described herein. An example implementation of one or more components of DID system 102 is shown by computer system 800 (shown in FIG. 8).

In some examples, DID system 102 may obtain location data and market data from among respective location data source(s) 104 and market data source(s) 106 via data collector 112. Although not shown, the data collector 112 may include one or more input and/or output interfaces (e.g., an electronic device including hardware circuitry, an application on an electronic device) for communication with other components of environment 100 (e.g., the one or more location data sources 104 and the one or more market data sources 106 and in some examples the one or more user devices 108.

Data collector 112 may be configured to obtain location and market data through any suitable electronic data collection technique. For example, data collector 112 may obtain data through or more data feeds (including streaming (live) data feed(s)), one or more file transfers (including, in some examples, one or more secure file transfers), by data being pushed to DID system 102 and/or by DID system 102 pulling and/or extracting data and/or information from among the one or more location data sources 104 and/or the one or more market data sources 106. In some examples, data collector 112 may include security protection (e.g., encryption, decryption) to protect the integrity of the obtained data.

In some examples, data collector 112 may perform one or more of filtering, data normalization, data reformatting, data aggregation and the like. In some examples, electronic data that may be obtained by data collector 112 may include data that may be unable to be processed, data that includes one or more errors and the like. In some examples, different sources among the one or more location data sources 104 and the one or more market data sources 106 may transmit data with various unique, non-standard values and/or data formats (e.g., proprietary formats). Furthermore, data content may correspond to different forms of data, such as different currencies, date formats, time periods, etc.

Non-limiting examples of data filtering that may be performed by data collector 112 may include excluding null data values, excluding corrupted data, excluding outlier data values (e.g., a data value outside of a pre-defined value range, outside of a pre-defined time range) and the like.

In some examples, data collector 112 may reformat the collected data to one or more common formats and/or normalize the collected data. In some examples, data collector 112 may be configured to aggregate and/or combine at least a portion of the collected data (e.g., according to one or more pre-defined categories (such as a type of data, one or more predetermined time periods, etc.)). The data collector 112 may normalize location data received from different sources to ensure that naming/categorization of the data is consistent (e.g., always "USA" and not "U.S.A.", "United States", "America", etc.). This may allow the location data to be processed and displayed by the interactive map interface 122 in a consistent, normalized manner, regardless of the original data source. The normalized location data also makes polygon searches more efficient and reliable (i.e., the formatting of the normalized location data may match the formatting of the normalized polygon names polygon database 206 described in the FIG. 2).

Data feed distributor 114 may be configured to receive the collected data from data collector 112. Data feed distributor 114 may also be configured to communicate with polygon support system 116 and gateway server 118. In some examples, data feed distributor 114 may also be configured to communicate with client application(s)/service(s) 126. In some examples, data feed distributor 114 may also be configured to communicate with data cache(s) 124.

In general, data feed distributor 114 may be configured to process the received data (e.g., the collected market and location data), and may distribute the received data to one or more among polygon support system 116, gateway server 118, data cache(s) 124 and client application(s)/service(s) 126 (not all connections with data feed distributor 114 shown). Data feed distributor 114 may determine which component to distribute the received data to, based on one or more characteristics of the received data (e.g., data type, one or more predetermined conditions, one or more predetermined parameters and the like). In general, data feed distributor 114 may distribute location data among the received data (collected from the one or more location data sources 104) to polygon support system 116 and may distribute market data among the received data (collected from the one or more market data sources 106) to gateway server 118.

Gateway server 118 may be configured to receive one or more of market data and location data from data feed distributor 114. In some examples, gateway server 118 may include a tick engine and at least one database, for processing large amounts of market data that may change rapidly (e.g., user orders, market events, quotes, etc.). Gateway server 118 may also include a presentation tool for generating presentation packages, including integrated location and market data presentation packages.

Upon receiving the market data and location data (either together or separately) from data feed distributor 114, the gateway server 118 may generate an initial presentation package suitable for presentation and interaction (e.g., on interactive GUI 120, via an API, etc.). The gateway server 118 may send the initial presentation package to the interactive GUI 120. In general, gateway server 118 may provide market data and location data to the interactive GUI 120 that may include real-time (e.g., streaming) data, near-real-time data, historical (e.g., static data), future data and/or any combination thereof.

The initial presentation package may include any suitable data and/or information (including location data, market data, other suitable data, and/or any combination thereof) configured in a manner for presentation and/or user interaction, including, but not limited to, one or more of at least one chart, at least one watchlist, at least one alert, at least one grid application, at least one table, user input options and the like. In some examples, at least a portion of the data and/or information presented in the initial presentation package may be user-customizable. In some examples, the data and/or information in the initial presentation package may include one or more (live) data streams, such that the data and/or information presented by the initial presentation package may be updated concurrently with the data in the data stream(s). In some examples, the initial presentation package may also include historical (e.g., static data) and/or future (e.g., forecasted or predicted) data.

Application server 119 may communicate with the interactive GUI 120 and the polygon support system 116, as well as with gateway server 118. As described below, the interactive GUI 120 may receive user input that includes a request for augmented location data. The interactive GUI 120 may send a request to the application server 119, which may then communicate with the polygon support system 116 to retrieve one or more normalized polygons. The application server 119 may then transmit the one or more normalized polygons to the interactive GUI 120 for processing.

In an example, one or more of gateway server 118 and application server 119 may be connected to one or more backend servers. Although not shown, one or more of gateway server 118 and application server 119 may include a controller (e.g., at least one processor, a microcontroller and the like, such as processing device 802 shown in FIG. 8) and non-transitory memory (e.g., memory 806 shown in FIG. 8) storing one or more routines and or algorithms for performing the functions of gateway server 118 and application server 119 described herein. An example implementation of one or more components of gateway server 118 and application server 119 is shown by computer system 800 (shown in FIG. 8).

Polygon support system 116 may be configured to receive, normalize, store, and retrieve polygons. The word "polygon" may refer to any set of lat-long points that can be rendered on a map, such as dots, polygons, and/or a series of dots, etc. Polygon support system 116 may communicate with application server 119 to provide normalized polygons to the interactive GUI 120. In some examples, the polygon support system 116 may provide normalized polygons to application server 119 as a function of exchange time and/or interval time. Importantly, the normalized polygons, as generated by polygon support system 116, may be in a format that can be readily integrated with market data within the interactive GUI 120.

The interactive GUI 120 may be configured to integrate the normalized polygons with at least a portion of the location data and the market data (e.g., received from the gateway server 118) to form augmented location data and generate an augmented presentation package including the augmented location data. The augmented presentation package generated by the interactive GUI 120 may be displayed in an interactive map interface 122 and/or provided to the client application(s)/service(s) 126 for distribution to other applications/users by, in some examples, at least one application programing interface (API). The augmented presentation package may include one or more polygons for display on an interactive map interface 122 of the interactive GUI 120. The interactive map interface 122 may display the augmented location data, and may be configured to allow user selection of a portion of the map (e.g., clicking on a particular area with a pointing device). Responsive to the user selection, interactive GUI 120 may generate a predetermined streaming view of location and market data associated with the selected portion. In some examples, the augmented location data may be automatically updated based on (i.e., updated concurrent with) changes to the received location data.

Interactive GUI 120 may be configured to generate and display one or more widgets/applications in one or more windows. One of these widgets/applications may be the interactive map interface 122, which may have a uniquely configured arrangement of one or more input regions, one or more notification regions and one or more display regions. In some examples, one or more portions of interactive map interface 122 may be automatically updated (including in real-time such as streaming data or near real-time) responsive to changes in location data and/or market data. In some examples, the display region(s) may include an interactive display that permits/prompts user input and may be automatically updated in response to user input.

In some examples, interactive map interface 122 may include different configurations based on an underlying application and/or service (e.g., among client application(s)/service(s) 126) for which it is launched. For example, interactive map interface 122 may have a first configuration for a mobile application, may have a second (different) configuration for a desktop application and may have a third (different) configuration for a spreadsheet application. In some examples, interactive map interface 122 may include one or more windows with different configurations. In some examples, interactive map interface 122 may allow a user to drag and drop market data onto the interactive map interface 122 for automatic augmentation and display of the associated location data. In some examples, interactive GUI 120 may provide one or more prompts/fields that allow users to add market data with associated location data that is then automatically augmented and displayed on the interactive map interface 122.

In some embodiments, DID system 102 may include data cache(s) 124 (e.g., a hardware component and/or software component) for storing data and/or information associated with the various functions of DID system 102. Data cache(s) 124 may be configured to store collected data (e.g., by data collector 112 and distributed by data feed distributor 114), including, for example, location data from among the one or more location data sources 104 and market data from among the one or more market data sources 106. In some examples, data cache(s) 124 may store requested location datasets and/or presentation package(s). In general, data cache(s) 124 may be configured to store any data in which faster data retrieval of the data for future requests may be useful. In some examples, data cache(s) 124 may include a data manager (DM) (not shown) for controlling collection and/or retrieval of data in data cache(s) 124.

In some examples, DID system 102 may include storage (e.g., one or more databases) to store any parameters, configurations, functions, and/or other suitable data and/or information that may be useful for one or more of components 112-128. In some examples, the storage may be configured to store data distributed by data feed distributor 114 and/or data collected by data collector 112.

In some examples, DID system 102 may include client application(s)/service(s) 126 for creating instances of application(s) and/or service(s) for distributing data to user device(s) 108. In one non-limiting example, client application(s)/service(s) 126 may include one or more of a trading desktop, a spreadsheet application, a mobile application (e.g., an application that may be suitable for a display screen of a mobile device such as a smartphone) streaming (e.g. raw, normalized, filtered and/or aggregated) data feeds and/or one or more APIs for receiving data in one or more object-oriented programming languages (e.g., Java, Python™, R, etc.). In some examples, client application(s)/service(s) 126 may create instance(s) of application(s) and/or service(s) including interactive GUI 120 having at least one configuration of interactive map interface 122. In some examples, DID system 102 may be configured to expose a presentation package to one or more API(s) among client application(s)/service(s) 126.

In some examples, DID system 102 may include a client/server connection manager 128 (also referred to as connection manager 128) configured to manage client to server connection requests. In general, connection manager 128 may manage connection request(s) of user device(s) 108 to DID system 102 to access client application(s)/service(s) 126.

Figure 2:
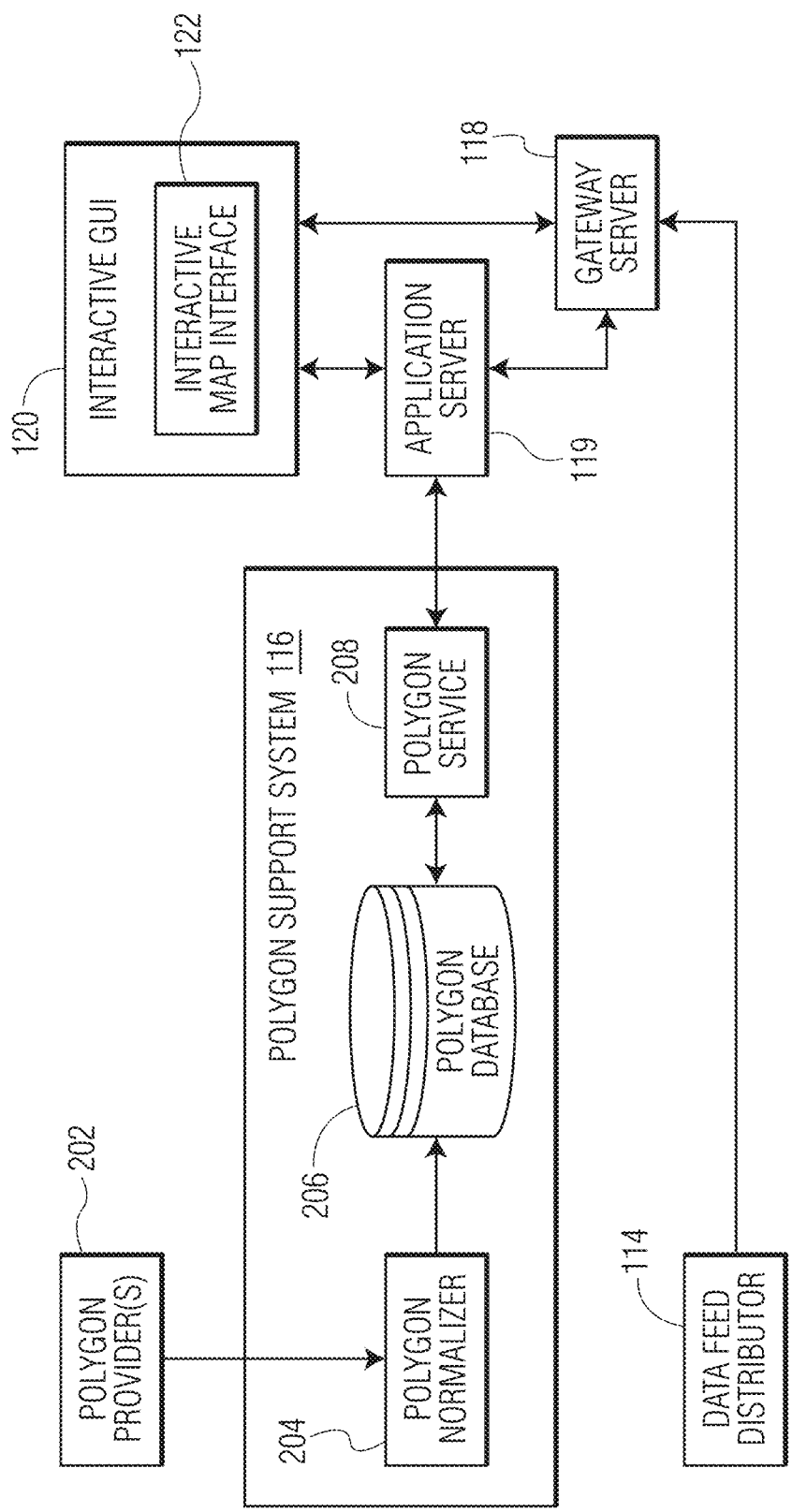
FIG. 2 is a functional block diagram of an example polygon support system, according to an aspect of the present disclosure.

Referring now to FIG. 2, a functional block diagram of example polygon support system 116 is shown. The polygon support system 116 may receive polygons from one or more polygon providers 202 and may include a polygon normalizer 204, at least one polygon database 206, and a polygon service 208. In some examples, the one or more polygon providers 202 may be third parties, and the polygon support system 116 and the one or more polygon providers 202 may be communicatively coupled via the one or more networks 110 (FIG. 1). In another example, the one or more polygon providers 202 may be a components of the DID system 102 (FIG. 1). One or more of components 204-208 of the polygon support system 116 may communicate with each other via a data and control bus (not shown).

Although not shown, the polygon support system 116 may include a controller (e.g., at least one processor, a microcontroller and the like, such as processing device 802 (shown in FIG. 8) and non-transitory memory (e.g., memory 806 shown in FIG. 8) storing one or more routines and or algorithms for performing the functions of the polygon support system 116 described herein. An example implementation of one or more components of the polygon support system 116 is shown by computer system 800 (shown in FIG. 8).

The polygon normalizer 204 may convert all polygons received from the one or more polygon providers 202 to a single normalized format. In an example, the polygons may be converted to GeoJSON and stored in the polygon database 206. Normalization may include (without being limited to) adding a unique identifier (i.e., a polygon name) to each record. Normalization may also include appending additional location name variations that may allow the polygon service 208 to search the polygon database 206 using a variety of names for a location. In an example, the normalized polygons may be generated by the polygon support system 116 itself.

The polygon database 206 may store normalized shapes or locations for display on the interactive map interface 122. The word "polygon" may refer to any set of latitude-longitude (also referred to as lat-long) points that can be rendered on a map, such as dots, a series of dots (either connected or separate) a line, a series of lines (connected or separate), shapes, icons, etc. A dot may be a single location on a map represented as latitude and longitude. A dot may be used to identify, for example, a city or city center, a port, an airport, a gas station, or any other fixed location. A polygon may be a series of dots that, when connected, may form some closed shape on a map. Shapes may include, for example, a country, a state, a province, a region, a county, a city, and any other desired area. A location set may be a series of dots that may represent a natural gas pipeline, a river, a map of streets, roads & highways, a vessel flow over time (e.g., a lat-long for a vessel's location each day), a railroad track network between stations, or any number of other multi-lat-long series.

The polygon database 206 may store each of the normalized shapes as lat-long points along with identifying information such as (without being limited to) country name, state name, county or province name, city name, port name, station name, or pipeline name. These identifying fields may be populated for each entry in the polygon database 206, whenever applicable. For example, a city shape in the polygon database 206 may have a hierarchal classification, such as a country name, state name, county name, and city name as part of the record. A state shape in the polygon database 206 may only include a country name and state name. The polygon database 206 may also link polygons to each other (e.g., state polygons may be linked to the respective country polygon).

In addition to storing polygons, the polygon database 206 may store dots as well as complex trees (e.g., a lattice of point-to-point connections such as a pipeline network or a set of river tributaries). Multiple polygons may be stored for a single location, which may allow for a time-series for a location that changes shape over time. The polygon database 206 may store a "rough" polygon (e.g., relatively few points) or a detailed polygon (thousands or even millions of points). The rough polygon may be useful for speed of rendering, while the detailed polygon may provide greater accuracy.

The polygon service 208 may receive polygon requests from the application server 119 as triggered by user input to the interactive map interface 122. The polygon request may include the location data for one or more instruments/symbols displayed on the interactive GUI 120. Since the location data may be normalized, the polygon service 208 may be able to easily locate corresponding polygons (which have also been normalized) in the polygon database 206. The polygon service may retrieve the polygons from the polygon database 206 and send the polygons to the application server 119 for transmission to the interactive GUI 120, which may then incorporate the polygons into an augmented presentation package. In a non-limiting example, polygon service 208 may be implemented as a Java web server. The polygon service 208 may support hypertext transfer protocol (HTTP) queries. The polygon service 208 may perform normalization of incoming queries (e.g., normalizing "New York City," "NYC" and "New York") to the unique identifier used to store New York City polygon(s) in the polygon database 206 (e.g., "POLY_USA_NYC"). The polygon service 208 may support multi-queries (e.g., retrieve polygons for all counties in CA). The polygon service 208 may be able to render a location such as a city as either a polygon or a fixed dot, for example, based on a specification of which type (polygon or dot) is desired when sending a request to the polygon service 208.

The client application(s)/service(s) 126 (FIG. 1) may render the interactive GUI 120 and interactive map interface 122 to end users. The interactive GUI 120 may also display pricing (and other) information about individual instruments (e.g., stocks, bonds, NatGas pipelines, vessels, etc.) in a watchlist. The pricing information displayed in the watchlist may be delivered via the data feeds (e.g., via data feed distributer 114 shown in FIG. 1), which may also include location data.

When a user makes a data request (e.g., drags-and-drops an instrument(s) from a watchlist displayed on the interactive GUI 120 to the interactive map interface 122), the interactive GUI 120 may send a request to the application server 119, which in turn may query the polygon support system 116 to acquire the appropriate shapes for the location data (i.e., the location names) associated with that instrument. For example, the polygon service 208 may identify one or more of a normalized identifiers (e.g., country name, a state name, and a city name associated with market data, such as a corporation or port associated with an instrument) and then query the polygon database 206 for the relevant polygons, which may be indexed according to corresponding normalized identifiers. In an example, the polygons may be indexed in a hierarchal manner. For example, level 0 may be polygons that represent one or more countries or a region; level 1 may be one or more states or subregions within level 0; level 2 may be one or counties or county groups within level 1; level 3 may be one or more cities or urban regions within level 2; level 4 and beyond may be any smaller increment.

When the application server 119 receives the various shapes back from the polygon service 208, it may transmit them to the interactive GUI 120, which may generate an augmented presentation package that is then rendered on the interactive map interface 122 and is used to display the relevant feeds data, and any updates, on the interactive GUI 120 in real time. The interactive GUI 120 may automatically render the augmented presentation package based on pre-configured metadata that controls what fields should be displayed as well as the look/feel of the shapes themselves, based on unique groupings of the feeds. This may result in the interactive map interface 122 showing polygons representing the location data relevant to the instrument(s) selected by the user. In an example, all the user needs to do is drag-and-drop the instrument(s) with location data from the watchlist to the interactive map interface 122.

Many instruments have location data that is static and does not change over time. Other instruments have location data that changes (e.g., a shipping vessel may travel from port-to-port over time). As location data for an instrument changes, the updated lat-long of the instrument may be received, and the interactive GUI 120 may generate an updated augmented presentation package in real-time. The interactive map interface 122 may automatically update the instrument's (e.g. a vessel's) visual location on the interactive map interface 122 as the augmented presentation package is received.

Figure 3:
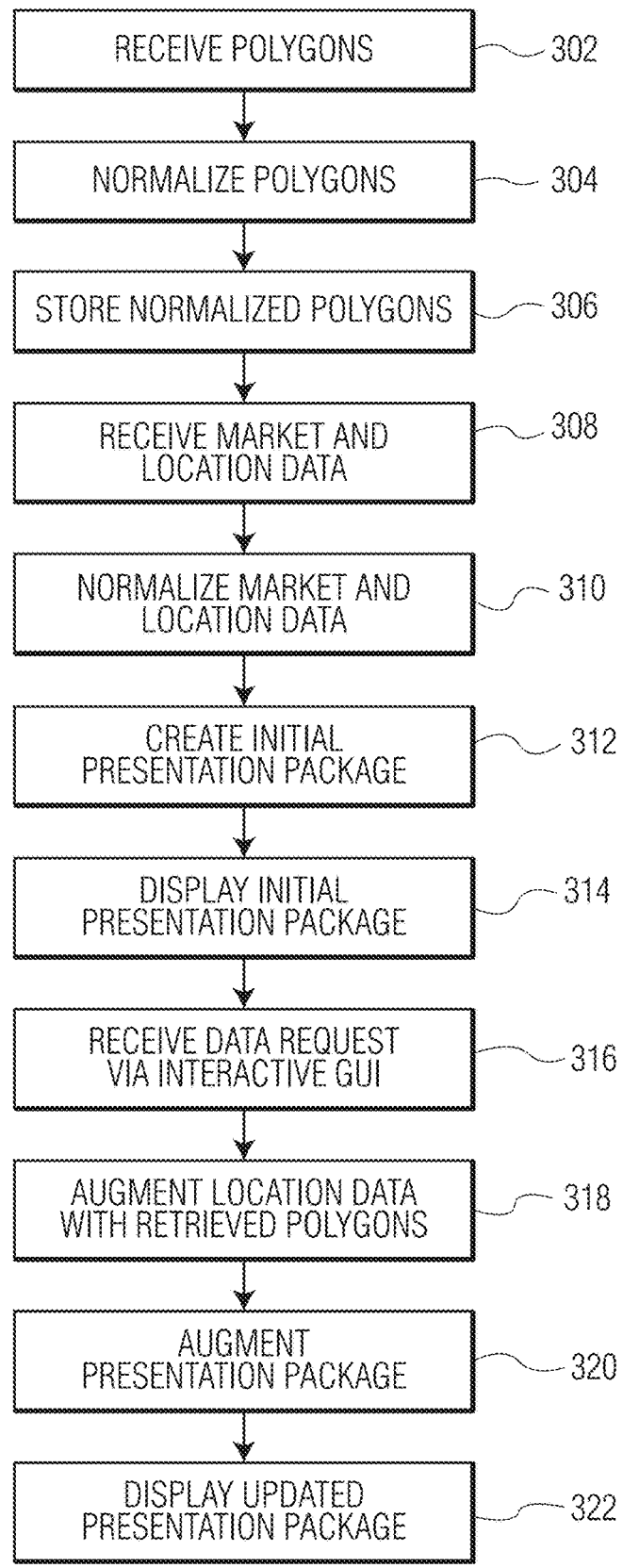
FIG. 3 is a flow chart illustrating an example method for displaying location data as polygons on an interactive map interface, according to an aspect of the present disclosure.

Referring now to FIG. 3, a flow chart illustrating an example method for displaying location data as polygons on the interactive map interface 122 is shown. FIG. 2 is described with respect to FIGS. 1 and 2. At step 302, the polygon support system 116 may receive polygons from the one or more polygon providers 202. At step 304, the polygons may be normalized by the polygon normalizer 204. At step 306, the normalized polygons may be stored in the polygon database 206. At step 308, location data from the one or more location data sources 104 and market data from the one or more market data sources 106 may be received by the data collector 112. At step 310, the data collector 112 may normalize the location data to a format that matches the normalized polygons stored in the polygon database 206.

At step 312, the gateway server 118 may generate an initial presentation package for display on the interactive GUI 120. At step 314, the initial presentation package may be displayed on the interactive GUI 120. At step 316, the user may interact with the interactive GUI 120 and submit a data request via the interactive GUI 120.

At step 318, the interactive GUI 120 may pass the data request to the application server 119, which may query the polygon support system 116 to retrieve normalized polygons based on the normalized location data. The polygon service 208 may retrieve normalized polygons from the polygon database 206 and may provide the normalized polygons to the application server 119, which may then transmit the normalized polygons to the interactive GUI 120. The interactive GUI 120 may augment the normalized location data with the normalized polygons. At step 320, the interactive GUI 120 may generate an augmented presentation package with the augmented location data (e.g., polygons). At step 322, the augmented presentation package may be displayed by the interactive map interface 122, such that the polygons are shown on the map.

Figure 4A:
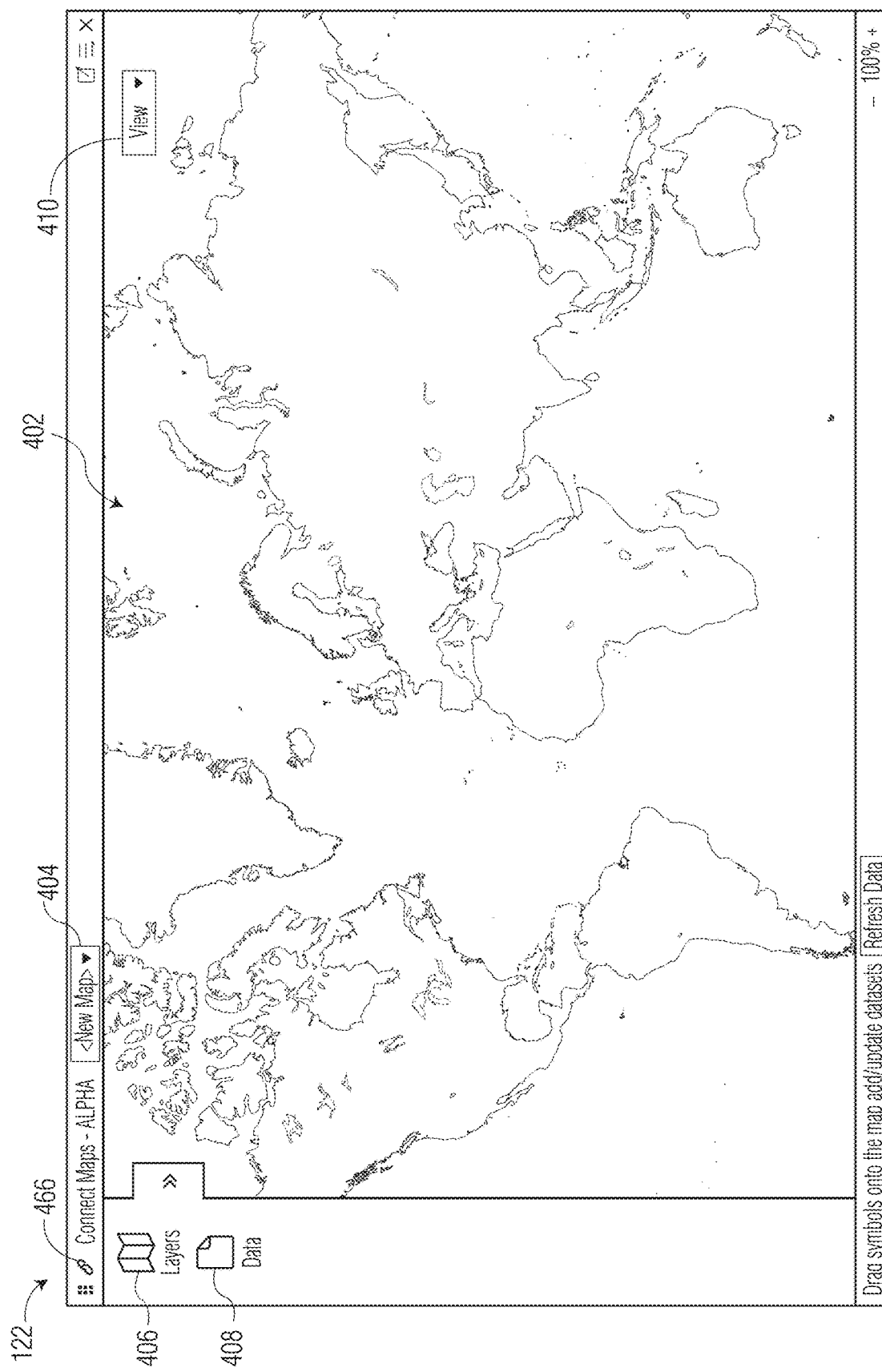
FIG. 4A is a screenshot of an example interactive map interface, according to an aspect of the present disclosure.

Referring now to FIG. 4A, an example screenshot of the interactive map interface 122 of interactive GUI 120 is shown, according to various embodiments of the present disclosure. The interactive map interface 122 may include a map window 402, a map selector 404, a layers button 406, a data button 408, a view button 410, a refresh data button 412, and a link button 466. The map window 402 may be configured to receive user input to allow a user to pan, zoom, and move the map. The map selector 404 may be a dropdown menu that allows a user to select a map window 402 from one or more predefined maps or custom maps created and saved by the user. The layers button 406 may allow a user to view details/information of one or more layers displayed on the map window 402. The link button 466 may open a broadcasting window 464 described in detail below with reference to FIG. 4I.

The data button 408 may display a data panel upon receiving user input. The data panel may allow users to open a pop-up window where symbols that make up a layer as well as fields and field values are listed (e.g., a of a particular dataset). The view button 410 may, upon receiving user input, open a dropdown menu with different sections. For example, the dropdown menu may include a section that changes the map type (e.g., normal, terrain or satellite), a section that changes the view type (e.g., 2D or 3D), and a section that changes a theme/coloration (e.g., system settings, light, or dark). The refresh data button 412 may, upon receiving user input, perform a manual refresh of data present on the interactive map interface 122. However, the interactive map interface 122 may also perform an automatic refresh in real-time as data is received or after set intervals (e.g., every 12 minutes) depending on user and bandwidth settings.

A user may add augmented location data to the interactive map interface 122 by dragging and dropping one or more symbols/identifiers from a watchlist displayed in a window of the interactive map interface 122. Additionally or alternatively, a user may select one or more market datasets having associated location data from a list (e.g., a dropdown list) displayed in a window of the interactive map interface 122. In either scenario, the interactive GUI 120 may identify the market data and associated location data selected by the user along with any default preferences for that type of data.

Figure 4B:
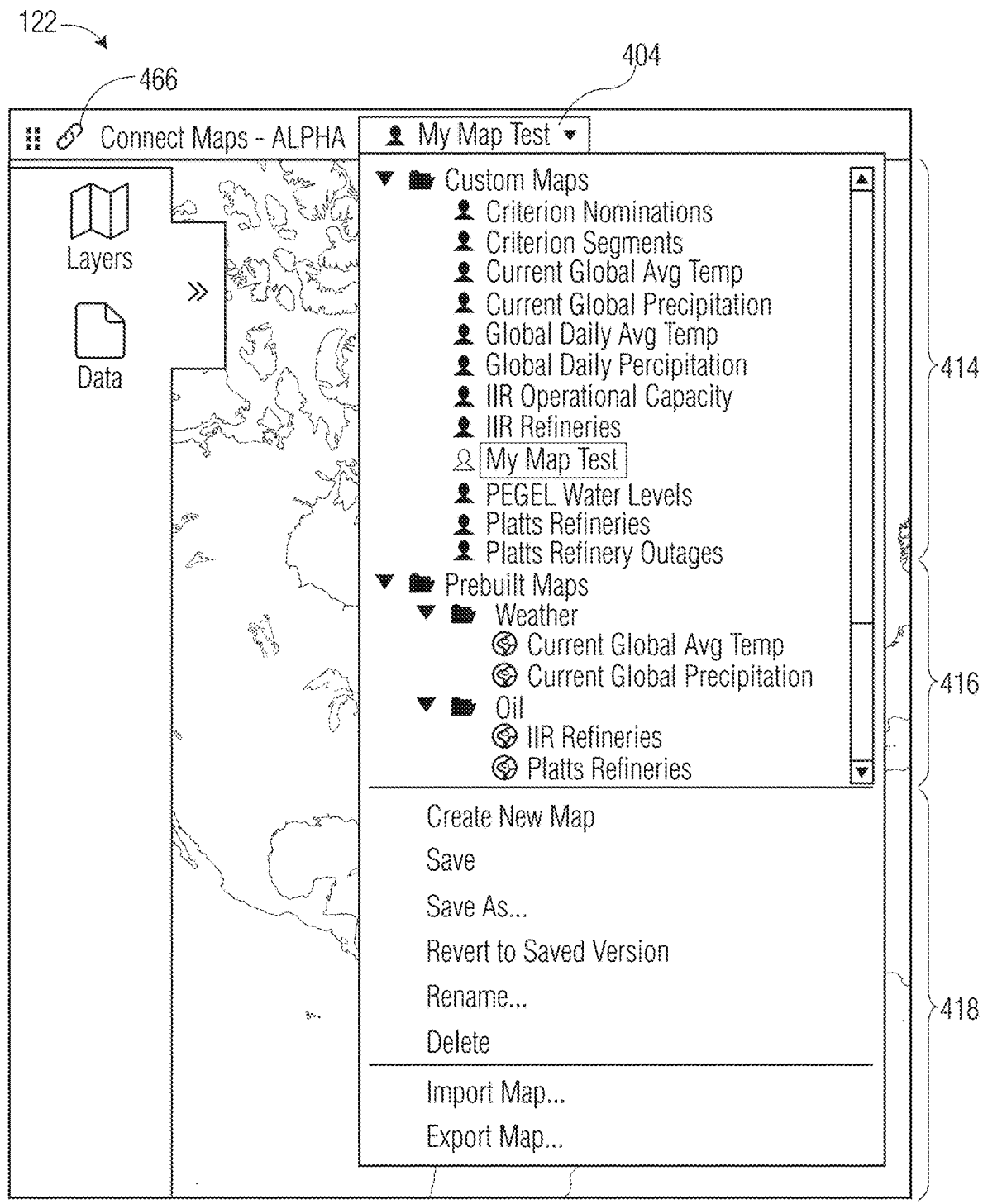
FIG. 4B is a screenshot of a map selector dropdown menu of the interactive map interface shown in FIG. 4A, according to an aspect of the present disclosure.

Referring now to FIG. 4B, a screenshot of the map selector 404 dropdown menu of interactive map interface 122 is shown. The map selector 404 may have three main sections: custom maps section 414, prebuilt maps section 416, and actions section 418. The custom maps section 414 may include a list of user saved maps. Users may rename, delete, edit, and save these custom maps as desired. The prebuilt maps section 416 may include a list of one or more prebuilt maps. Users may not be able to delete a prebuilt map, but may be able to add additional layers or preferences and save a copy of the new version as a custom map using the "save as" button in the actions section 418. The actions section 418 may allow a user to take one or more actions. For example, "Create New Map" may open a blank map template. "Save" may allow a user to save changes. This may be enabled on a custom map when a user has made a change. "Save As" may open a small dialog window that allows a user to enter a new name for a custom map. This may be enabled regardless of map selection. In some examples, a user may not be able to save a map with a name that is already saved. "Revert to Saved Version" may remove any changes made to a custom map after the last save. This may be enabled on a custom map when a user has made a change. "Rename" may open a small dialog window that allows a user to input a new name for the selected map. This may not be enabled when a prebuilt map is selected. "Delete" may delete the selected custom map. This may not be enabled when a prebuilt map is selected. "Import Map" may open a pop-up window to allow a user to select a saved map file. "Export Map" may open a pop-up window that allows a user to name and save a map file in a desired location. After the map is saved, a confirmation message may be displayed, including the name of the file.

Figure 4C:
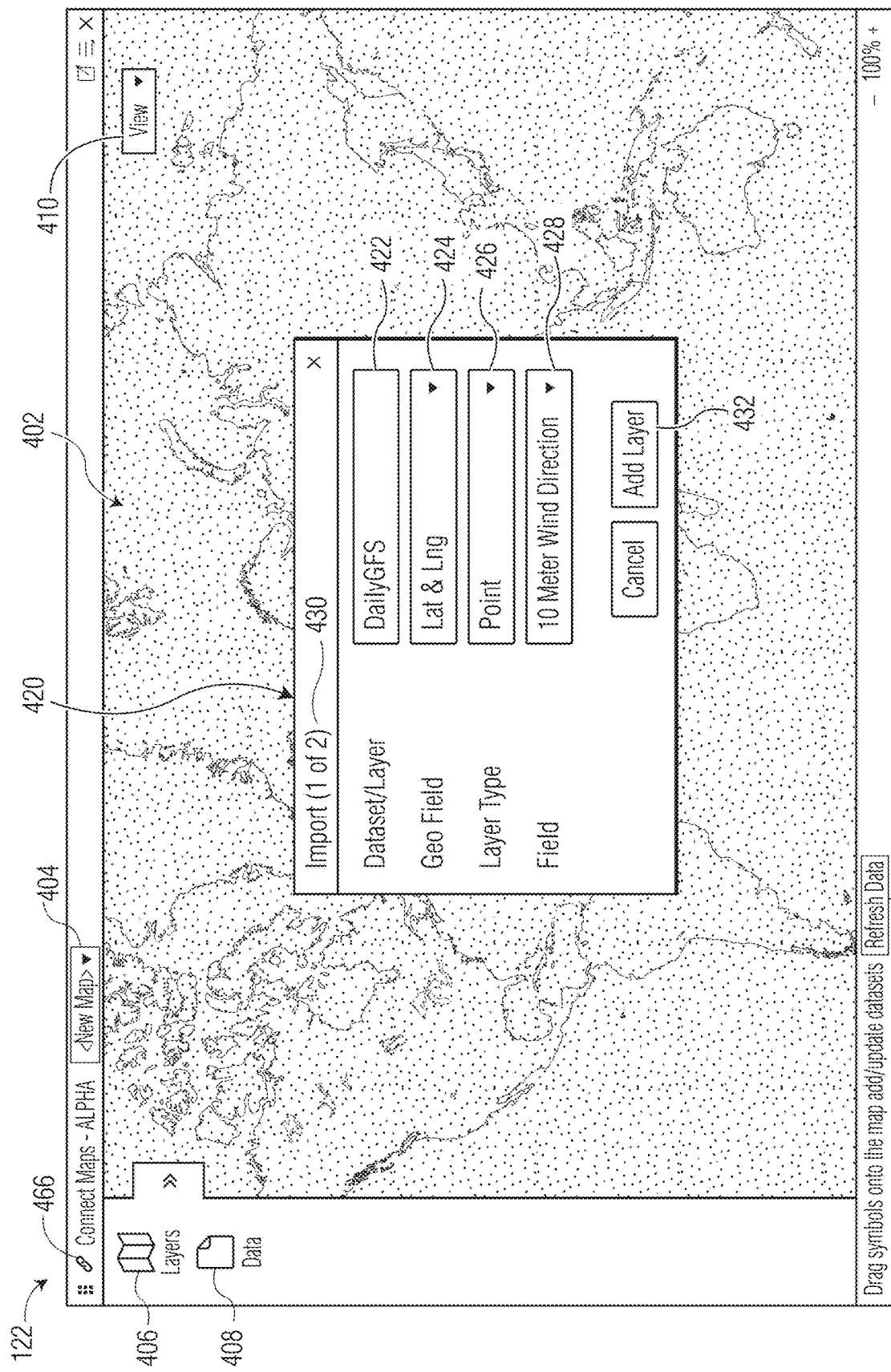
FIG. 4C is a screenshot of an import window of the interactive map interface shown in FIG. 4A, according to an aspect of the present disclosure.

Referring now to FIG. 4C, a screenshot of an import window 420 of interactive map interface 122 is shown. The import window 420 may be displayed (e.g., over the map window 402) after a user adds one or more symbols and/or datasets to the interactive map interface 122 (e.g., as a layer), either by selecting a dataset or dragging and dropping the one or more symbols. In a non-limiting example, the import window 420 may allow a user to change/customize one or more of the following: dataset/layer name 422, geographical field 424, layer type 426, and field 428. Symbols may have multiple geographical fields 424. The availability of these fields may dictate the type of layers that are available for a specific dataset (e.g., if lat-long is the only geo field available, the augmented location data may only be able to be plotted as a point on the map). The geographical field 424 may have one or more values (e.g., lat-long, region, country, state, county, city). The layer type 426 may be dynamic values that are based on geographical field selection. The layer type 426 may have one or more values (e.g., point, polygon, cluster, grid, hexbin, heatmap, etc.). The field 428 may be the value being plotted on the interactive map interface 122. Each dataset may have a specific field library. The import window 420 may include an indication 430 of how many datasets the user has selected or dragged and dropped. The import window 420 may include an add layer button 432 that allows the user to add another layer.

The interactive GUI 120 may prompt the application server 119 to query the polygon support system 116 to retrieve the respective polygons. The polygon support system 116 may provide normalized polygons to the application server 119, which may transmit them to the interactive GUI 120. If more than one dataset or symbols from more than one dataset is/are selected, the symbols may be automatically grouped and onboarded on a per dataset basis. The interactive GUI 120 may generate an augmented presentation package and display the augmented location data on the interactive map interface 122.

Figure 4D:
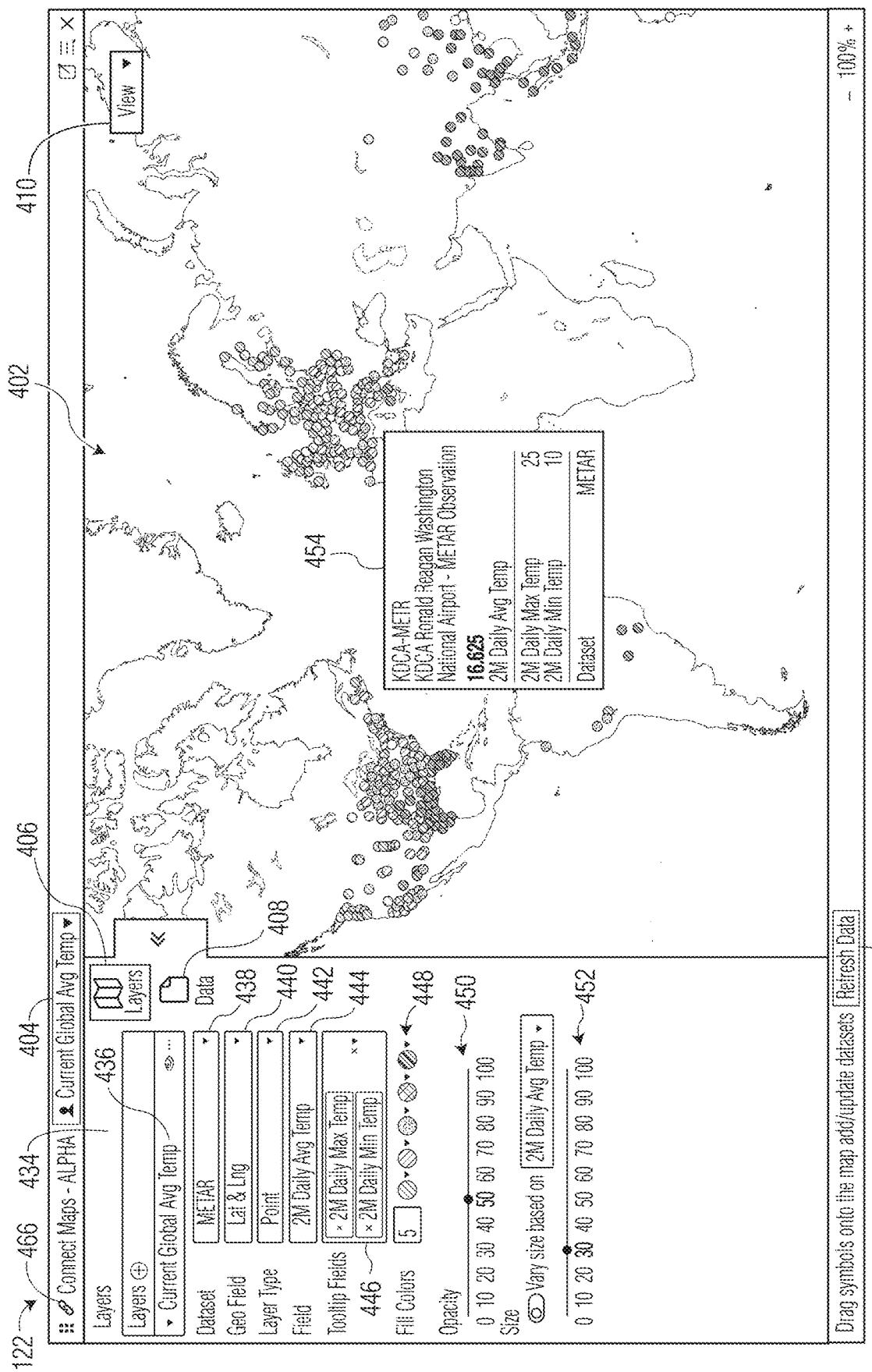
FIG. 4D is a screenshot of a map window and a layers menu for a point layer of the interactive map interface shown in FIG. 4A, according to an aspect of the present disclosure.

Referring now to FIG. 4D, a screenshot of the map window 402 and a layers menu 434 of interactive map interface 122 for a point layer is shown. The layers menu 434 may be accessible by the layers button 406. In an example, the layers menu 434 may automatically populate with stored preferences based on a particular dataset. The augmented data may be displayed as a layer on the map window 402. Multiple layers can be added to the same interactive map interface 122. Each layer may be linked to a dataset. However, there may be multiple layers associated with the same dataset. Any new dataset/layer added to the interactive map interface 122 may load with the dataset-specific layer preferences defaults. However, users may customize the preferences (e.g., colors, size, opacity, tooltip fields, etc.).

Users may be able to explore and modify preferences via the layers menu 434. In an example, the layers menu 434 may include selectable options for layer name 436, dataset 438, geographical field 440, layer type 442, metric field 444, and tooltip fields 446. The geographical field 440 may only show values supported by the selected dataset (e.g., if the dataset does not have country values, then country will not appear as an option). The layer type 442 values may default depending on the selection of geographical field 440. The layer type 442 value may default to either "points" or "polygon" depending on what geographical field 440 value is available for the selected dataset. For example, content that has lat-long or city geographical center information may be categorized as a point layer while content that has region, country, state, county or vertices (e.g., anything that has boundaries) may be categorized as a polygon layer.

The preferences shown in the layers menu 434 may vary based on the layer type 442. In an example, if a layer is categorized as a point layer, the layers menu 434 may also show options for one or more of fill colors 448, opacity 450, and size 452. The fill colors 448 may vary depending on the field selected. For example, when numeric, the fill colors 448 may display an automatic range of colors. When text-set values, the fill colors 448 may display a color selector next to each unique value.

The metric field 444 may support numeric and set values and may default to a system default for a specific content sent. The tooltip fields 446 may be a dropdown menu with different selections that display all field values for the specific dataset. Although not shown, the layers menu 434 may also include options for currency, unit, and other preferences. In a non-limiting example, the opacity 450 of the layer may be adjusted via a slider bar. Each layer may have some transparency as well as order of priority (e.g., the layer at the top of the layers menu may have the highest priority).

When a user selects history for the geographical field 440, one or more radio buttons may be shown in the layers menu 434. For example, the layers menu 434 may display one or more of a "hide history" radio button (when selected, no history lines may be shown on the map window 402), a "show history for selected point" button (when selected, will show a history line on the map window 402 when a user clicks on a specific point), and a "show history for all points" button (when selected, will automatically show history lines for all points on the map window 402). The user may define the color and style of the line and the history timeframe (e.g., past 180 days).

When a point layer is shown in the map window 402, the interactive map interface 122 may be configured to generate a pop-up window 454 whenever a user interacts (i.e., clicks on, hovers over) a point. In an example, the pop-up window 454 for the point layer may show information associated with the point, such as a symbol, a symbol description, a name and a value of the field being plotted, additional field names and values (e.g., controlled by the user from the layer panel), and a name of the dataset where the symbol comes from. The pop-up window 454 for the point layer may be similar to the pop-up window 454 for other types of layers and display similar information and/or it may display information specific to the point layer.

Figure 4E:
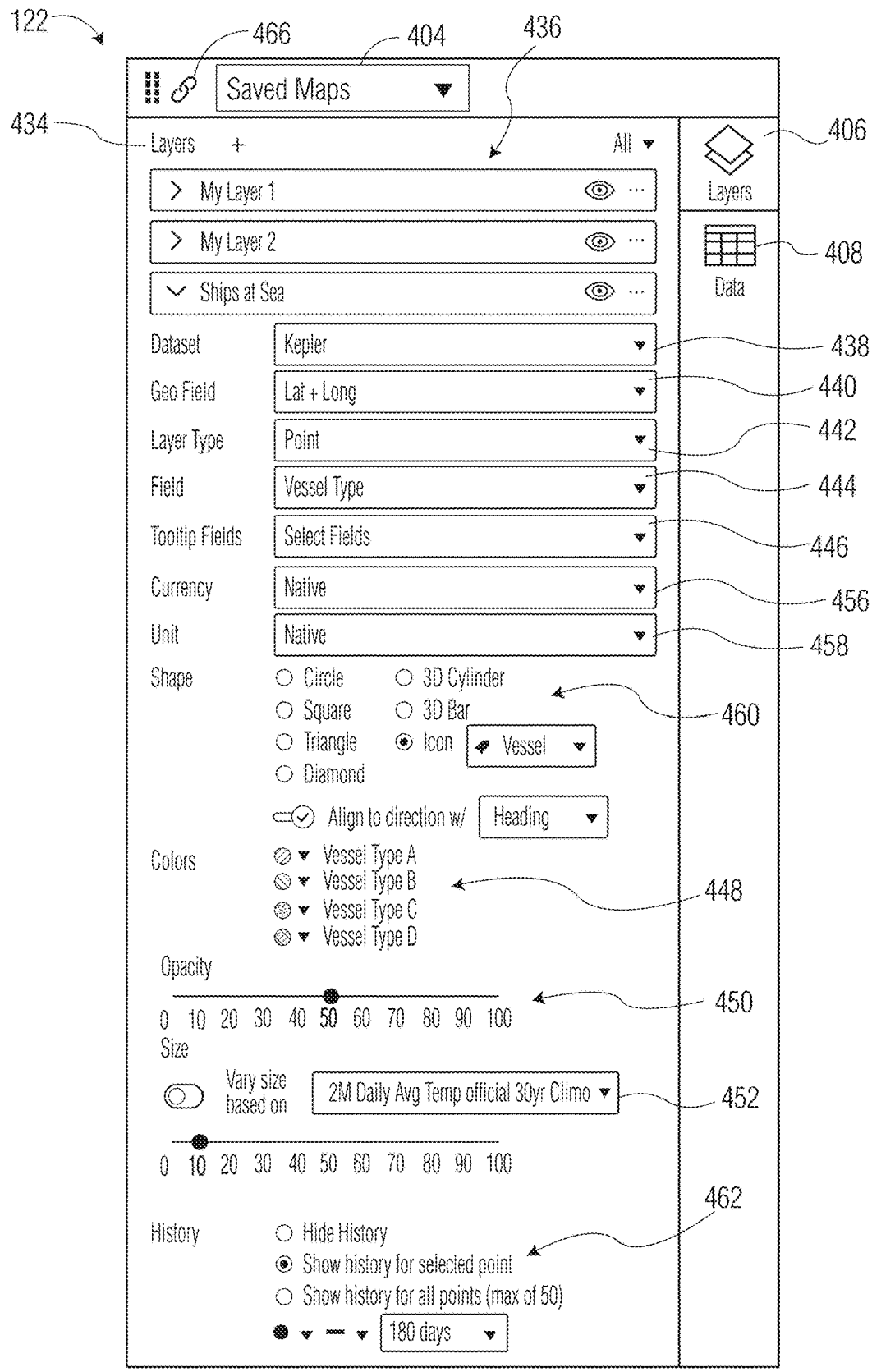
FIG. 4E is a screenshot of a layers menu of the interactive map interface shown in FIG. 4A, according to an aspect of the present disclosure.

Referring now to FIG. 4E, a screenshot of a layers menu 434 of interactive map interface 122 for another point layer is shown. The layers menu 434 may be accessible by the layers button 406. In an example, the layers menu 434 may automatically populate with stored preferences based on a particular dataset. The augmented data may be displayed as a layer on the map window 402. Multiple layers (e.g., "My Layer 1", "My Layer 2", and "Ships at Sea") may be added to the same interactive map interface 122. Each layer may be linked to a dataset. However, there may be multiple layers associated with the same dataset. Any new dataset/layer added to the interactive map interface 122 may load with the dataset-specific layer preferences defaults. However, users may customize the preferences (e.g., colors, size, opacity, tooltip fields, etc.).

Users may be able to explore and modify preferences via the layers menu 434. In an example, the layers menu 434 may include selectable options for layer name 436, dataset 438, geographical field 440, layer type 442, metric field 444, tooltip fields 446, currency 456, unit 458, shape 460, and history 462. The geographical field 440 may only show values supported by the selected dataset (e.g., if dataset does not have country values, then country will not appear as an option). The layer type 442 values may default depending on the selection of geographical field 440. The layer type 442 value may default to either "points" or "polygon" depending on what geographical field 440 value is available for the selected dataset. For example, content that has lat-long or city geographical center information may be categorized as a point layer while content that has region, country, state, county or vertices (e.g., anything that has boundaries) may be categorized as a polygon layer.

The preferences shown in the layers menu 434 may vary based on the layer type 442. In an example, if a layer is categorized as a point layer, the layers menu 434 may also show options for fill colors 448, shape 460 (e.g., circle, square, triangle, 3D object, icon), opacity 450, size 452, and history 462. The fill colors 448 may vary depending on field selected. For example, when numeric, the fill colors 448 may display an automatic range of colors. When text-set values, the fill colors 448 may display a color selector next to each unique value. When directional location data (e.g., speed, direction, heading, etc.) is detected, the shape 460 field may automatically display a switch that allows the shape to align to the direction (e.g., when triangle or icons such as "vessel" are selected).

The metric field 444 may support numeric and set values and may default to a system default for a specific content sent. The tooltip fields 446 may be a dropdown menu with different selections that display all field values for the specific dataset. The opacity 450 of the layer may be adjusted, for example, via a slider bar. Each layer may have some transparency as well as order of priority (e.g., the layer at the top of the layers menu may have the highest priority).

The size 452 field may have a switch that enables automatic sizing based one or more selectable parameters. When the switch is "on," the metric field 444 may be enabled and the size of points may vary based on their values. If the switch is "off," the metric field 444 may be disabled and all points may be the same size. The size 452 field may include, for example, a slider to adjust the size of the points. When the switch is "on," the slider may adjust the size of the points in scale of the metric selected.

If a particular dataset has history information, a history 462 with one or more radio buttons may be shown in the layers menu 434. For example, the layers menu 434 may display one or more of a "hide history" radio button (when selected, no history lines may be shown on the map window 402), a "show history for selected point" button (when selected, will show a history line on the map window 402 when a user clicks on a specific point), and a "show history for all points" button (when selected, will automatically show history lines for all points on the map window 402). The user may define the color and style of the line and the history timeframe (e.g., past 180 days).

Figure 4F:
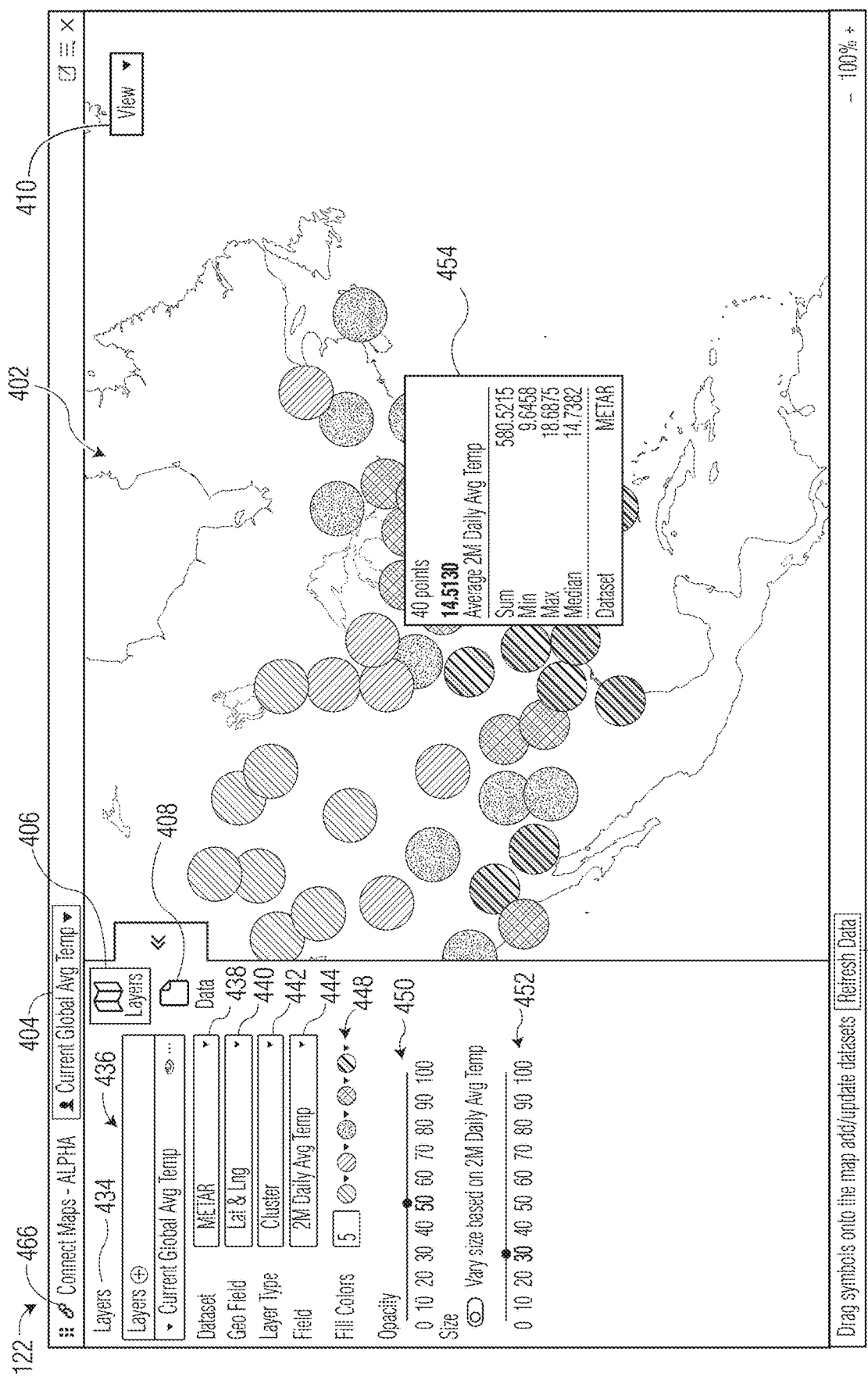
FIG. 4F is screenshot of the map window and a layers menu for a cluster layer of the interactive map interface shown in FIG. 4A, according to an aspect of the present disclosure.

Referring now to FIG. 4F, a screenshot of the map window 402 and a layers menu 434 of interactive map interface 122 for a cluster layer is shown. If a layer is a categorized as a cluster (e.g., grouping of points) layer, the layers menu 434 may show similar preferences. However, the tooltip fields 446 may not be displayed as the values may be calculated based on the selected metric field 444.

When a cluster layer is shown in the map window 402, the interactive map interface 122 may be configured to generate the pop-up window 454 whenever a user interacts (i.e., clicks on, hovers over) a cluster. For a cluster layer, the pop-up window 454 may be similar to the pop-up window 454 for other types of layers and may show the information described above and/or information specific to the cluster layer, such as updates on values of additional fields selected by a user for display.

Figure 4G:
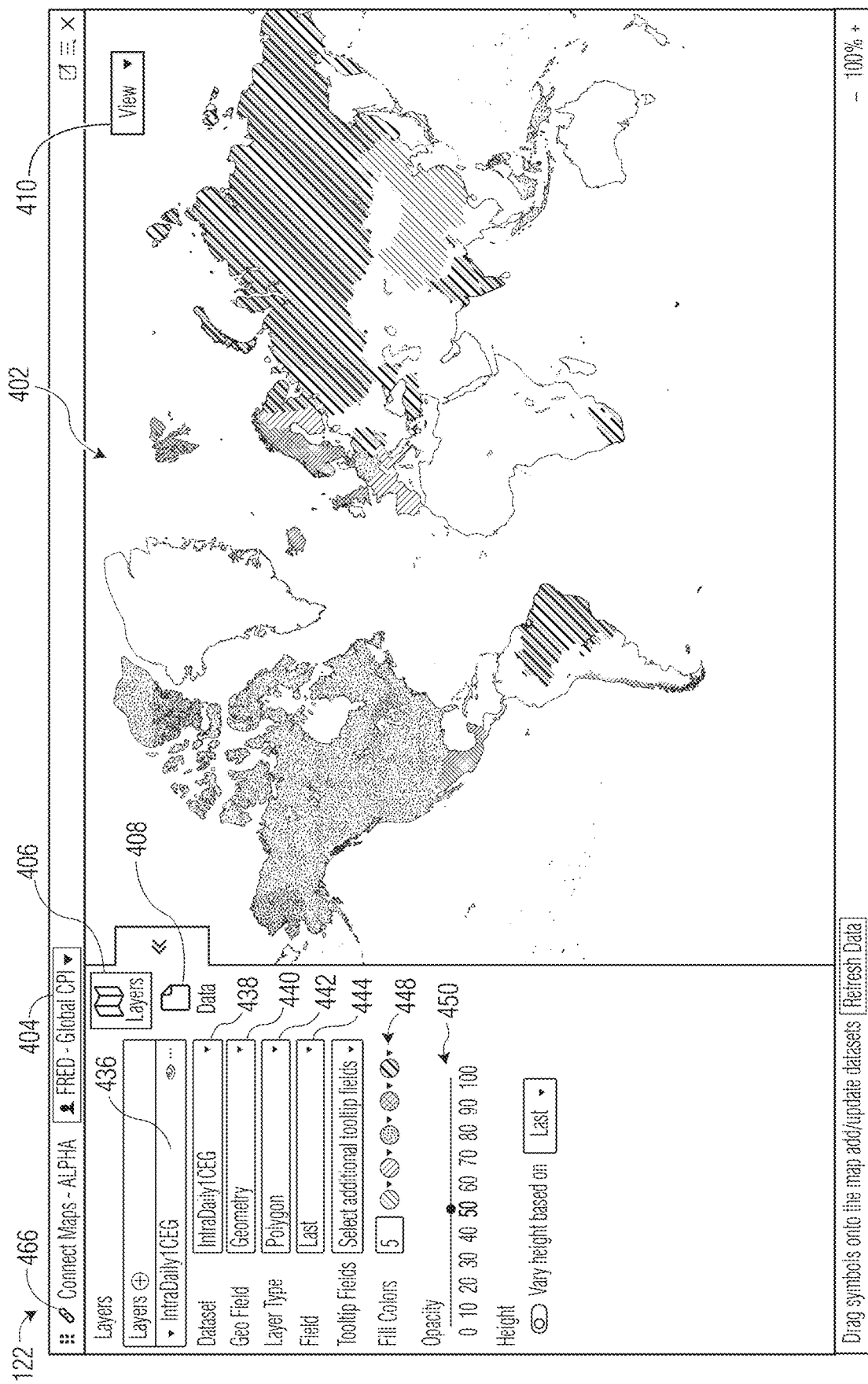
FIG. 4G is a screenshot of the map window and the layers menu for a polygon layer of the interactive map interface shown in FIG. 4A, according to an aspect of the present disclosure.

Referring now to FIG. 4G, a screenshot of the map window 402 and a layers menu 434 of interactive map interface 122 for a polygon layer is shown. If a layer is a categorized as a polygon layer, the layers menu 434 may show similar preferences, as described above. The layers menu 434 for a polygon layer may also include in the size 452 field a switch to enable/disable an automatic adjustment of the height of the polygons based on their values. As shown in FIG. 4G, the polygons may be of any shape and size.

Figure 4H:
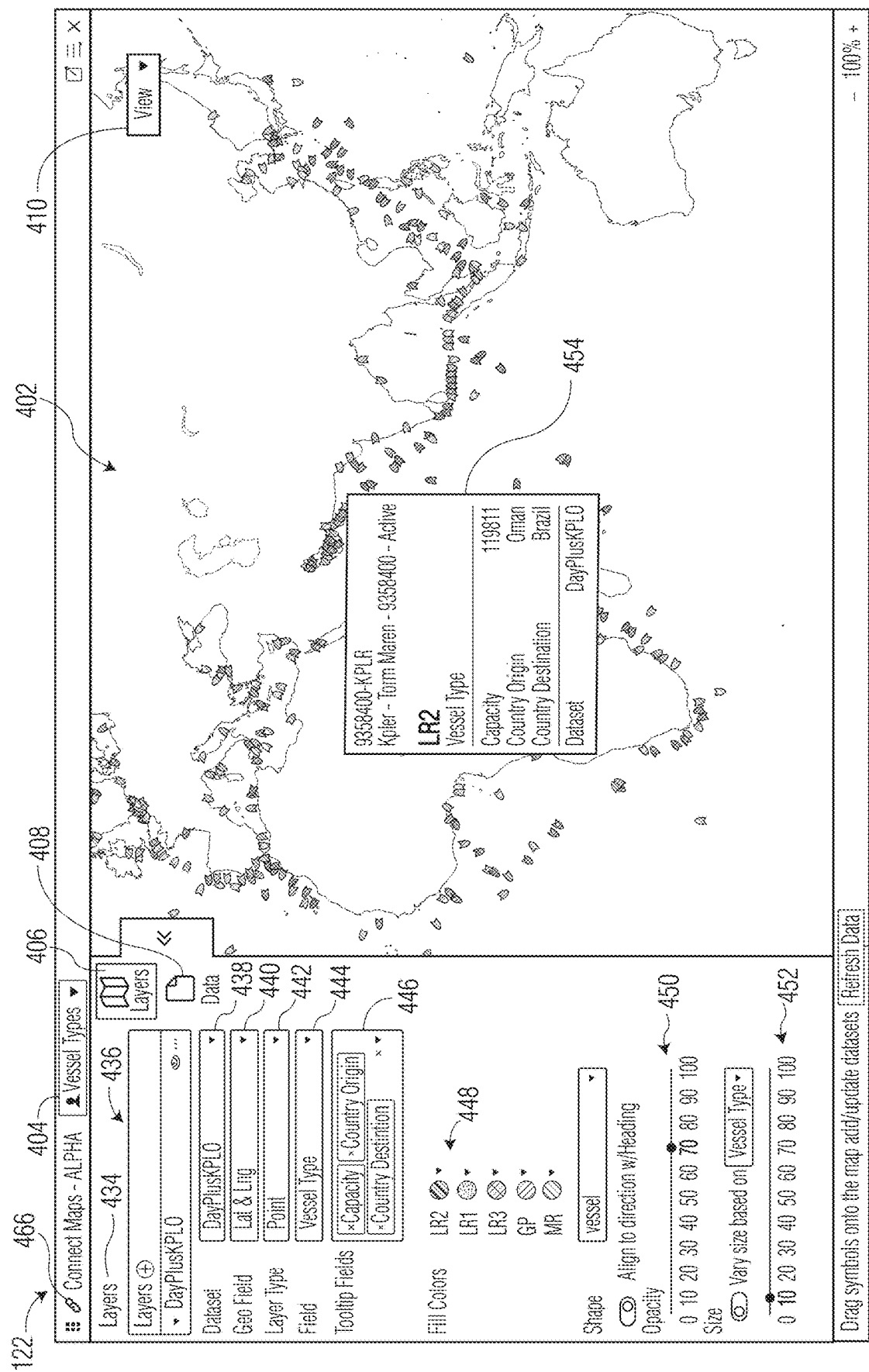
FIG. 4H is a screenshot of the map window and the layers menu for an icon layer of the interactive map interface shown in FIG. 4A, according to an aspect of the present disclosure.

Referring now to FIG. 4H, a screenshot of the map window 402 and a layers menu 434 of interactive map interface 122 for an icon layer is shown. If a layer is a categorized as an icon layer, the layers menu 434 may show similar preferences as described above. The layers menu 434 for an icon layer may also include in the size 452 field a switch to enable/disable an automatic adjustment of the height of the icons based on their values. As shown in FIG. 4H, the polygons may be of any shape and size and may be orientated in a direction based on the location data.

When an icon layer is shown in the map window 402, the interactive map interface 122 may be configured to generate the pop-up window 454 whenever a user interacts (i.e., clicks on, hovers over) a cluster. For an icon layer, the pop-up window 454 may be similar to the pop-up window 454 for other types of layers and may show the information described above and/or information specific to the icon layer, such as vessel type, capacity, origin, destination, etc.

Figure 4I:
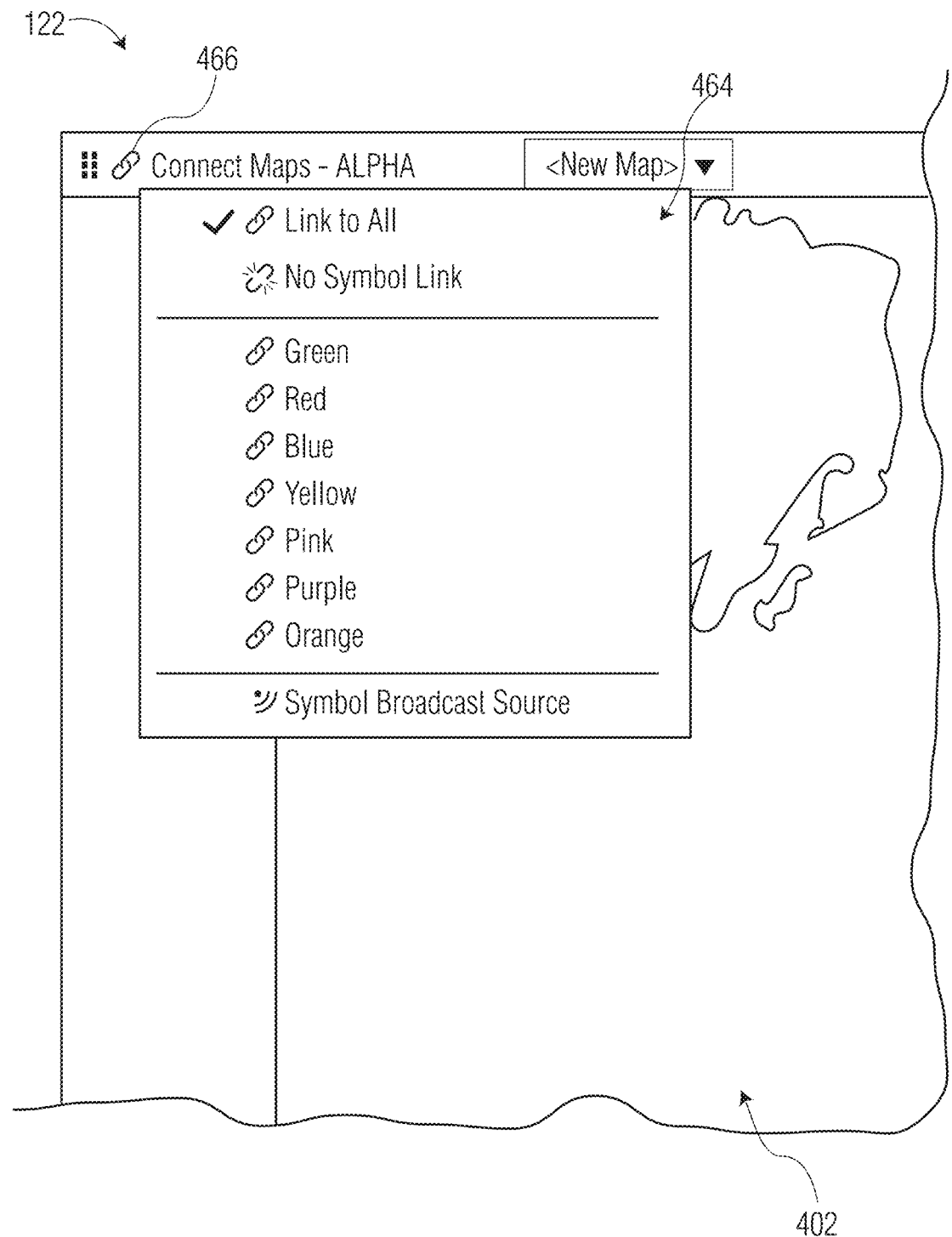
FIG. 4I is a screenshot of a broadcasting window of the interactive map interface shown in FIG. 4A, according to an aspect of the present disclosure.

Referring now to FIG. 4I, a screenshot of the broadcasting window 464 of the interactive map interface 122 is shown.

In an example, the broadcasting window 464 may be accessed when user input is received at the link button 466 of the interactive map interface 122. It should be noted that FIG. 4I is a closeup of the interactive map interface 122 for the purposes of clarity and only a portion of the map window 402 is shown.

The interactive map interface 122 may be capable of sharing and receiving context (e.g., one or more of the market data and the location data of a selected polygon) with other widgets/applications generated/displayed by the interactive GUI 120 via the client applications(s)/services(s) 126 shown in FIG. 1. This linking capability may allow users to automatically broadcast and update in real time what data is shown throughout the whole workspace (e.g., across multiple widgets/applications). Some widgets/applications, including the interactive map interface 122, may be configured to be both a sender and a receiver. Some widgets/application (e.g., a watch list) may be configured to only be a sender. Additionally, each widget/application may be set up to target a specific broadcast channel so that users may set up a dynamic set of workflows to meet their various needs.

When a user clicks on a record, the context of what was selected may be broadcasted with information on which channel should accept the context. Each widget/application that is set to listen on the specified channel may receive the context and react accordingly based on the expected action of that specific widget/application. Widgets/applications (e.g., the interactive map interface 122, chart, detailed quote, watchlist, etc.) may need to be subscribed to the same linking channel to broadcast/receive information. In an example, widgets/applications may be linked to all widgets/applications present on the workspace. Users may be able to define if a particular widget/application is a broadcaster, a receiver, or both.

In an example, the channels may be represented by colors. A user may set up a watch list widget/application to broadcast context changes out on a "red" channel. The user may also set up a chart widget/application and the interactive map interface 122 to listen to the "red" channel.

In an example, the interactive map interface 122 may act as a receiver. When the user clicks on a symbol within the watch list widget/application, the symbol context may be delivered to the chart widget/application and the interactive map interface 122 for each to render content. The chart widget/application may communicate with backend servers to fetch historical data and plot the data accordingly. The interactive GUI 120 may augment any received location data and render the data as a layer within the map window 402. If a particular identifier is selected in the broadcasting widget/application, the map window 402 may automatically display that identifier if it is present on any existing layers and zoom in to focus on that polygon. If the identifier is not present in the map window 402 but has geographical field 440 data, the interactive map interface 122 may create a temporary layer to display the point/polygon in the map window 402. The user may save this temporary layer by dragging and dropping the symbol into the map window 402 and following the workflow described above. The temporary layer may go away or may be replaced by a new one if the symbol is changed on the broadcasting widget/application.

Figure 5:
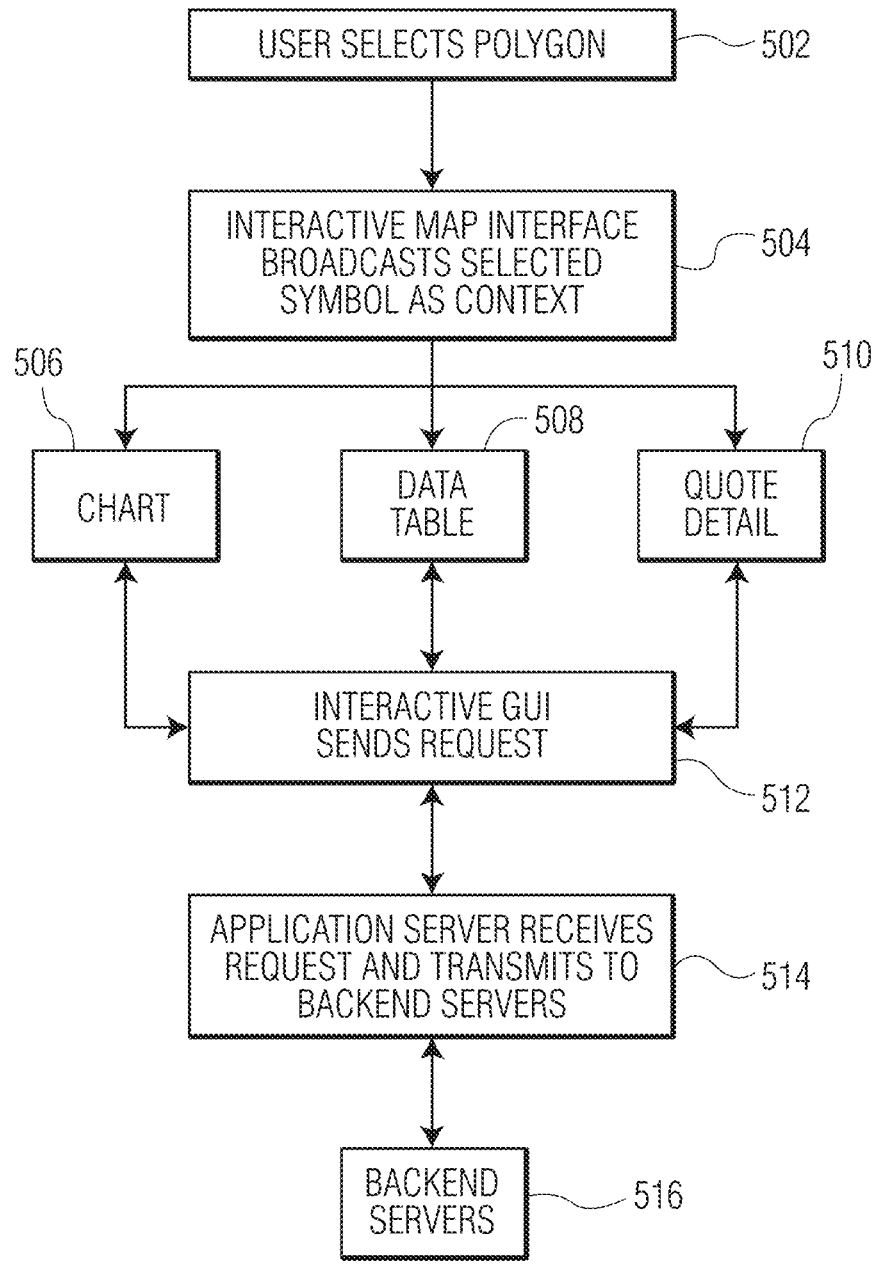
FIG. 5 is a flowchart illustrating an example of the interactive map interface serving as a broadcaster, according to an aspect of the present disclosure.

Referring now to FIG. 5, a flowchart illustrating an example of the interactive map interface 122 serving as a broadcaster is shown. At step 502, a user may select a polygon on the interactive map interface 122. At step 504, the interactive map interface 122 may broadcast the underlying symbol as context. At step 506, the symbol may be received by a chart widget/application. At step 508, the symbol may be received by a data table widget/application. At step 510, the symbol may be received by a quote e widget/application. It should be noted that steps 506, 508, and 510 may be concurrent. At step 512, the interactive GUI 120 may request any additional data needed to render the information requested by the user. At step 514, the request may be sent to the application server 119. At step 516, the application server 119 may send a request to one or more backend data servers. For example, the application server 119 may request one or more of historical (e.g., chart) data from a historical services server, real-time data (e.g., market data, news data, etc.) from backend servers that receive real-time information.

Figure 6A:
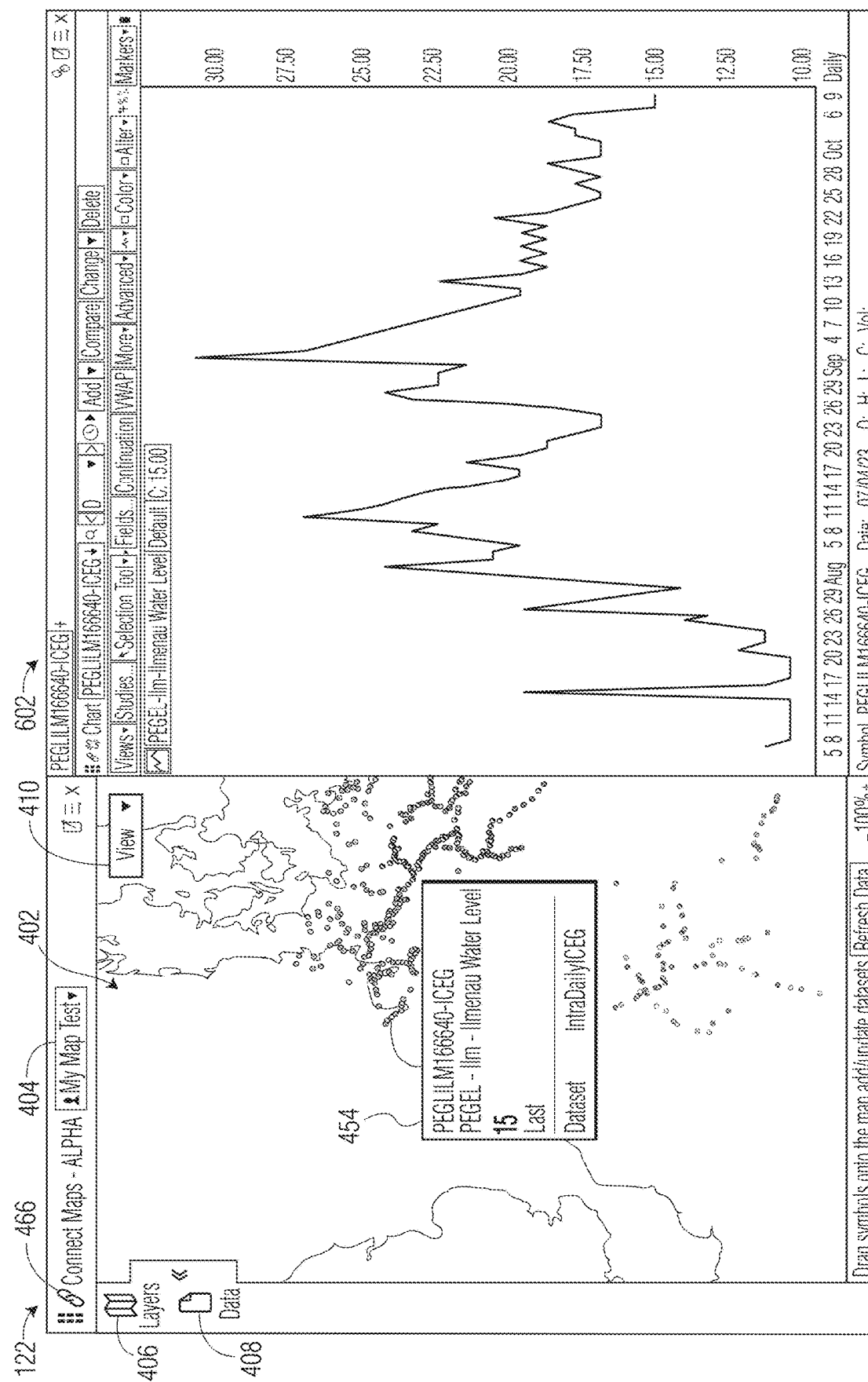
FIG. 6A is a screenshot of an example interactive map interface serving as a broadcaster, according to an aspect of the present disclosure.

Referring now to FIG. 6A, an example screenshot of the interactive map interface 122 serving as a broadcaster is shown. When a user clicks on a point in the map window 402, the identifier information may be broadcast to any widget/application present on the workspace that is subscribed to the same channel or that has "Link to All" enabled, such as a chart widget/application 602 of the interactive GUI 120. In an example, the char/widget application 602 may show historical values for one or more instruments. The historical values may be associated with one or more of intraday history (e.g., showing second-by-second pricing throughout a day and interday history (e.g., a single bar for each day or week, or month, or year that depicts a range of values for that day/week/month/year).

Figure 6B:
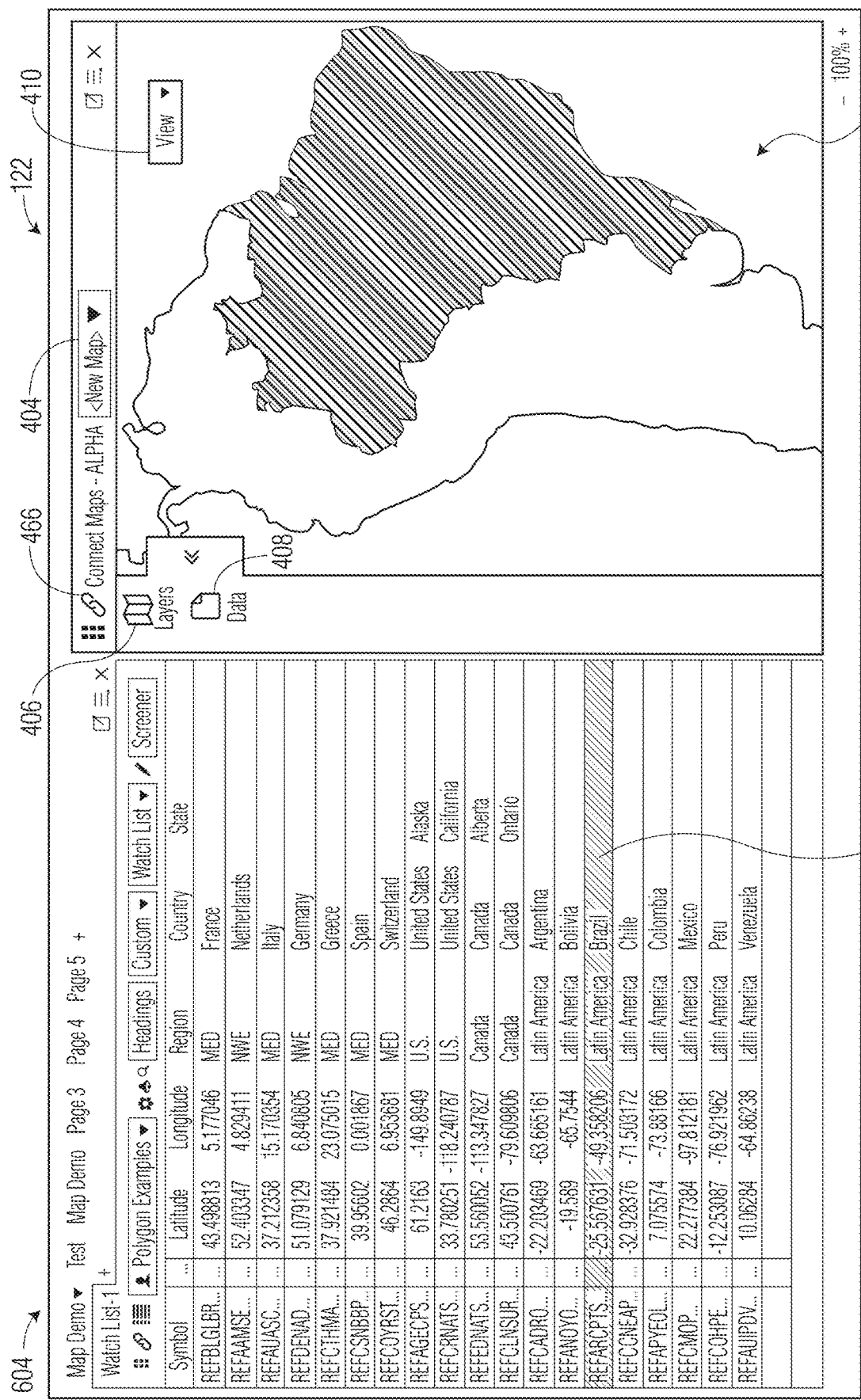
FIG. 6B is a screenshot of an example interactive map interface serving as a receiver, according to an aspect of the present disclosure.

Referring now to FIG. 6B, an example screenshot of the interactive map interface 122 serving as a receiver is shown. When a user clicks on one or more items 606 within a linked watchlist 604 of the interactive GUI 120, identifier information may be broadcast to the interactive map interface 122 and a relevant polygon (e.g., country) may be displayed in the map window 402.

Figure 7:
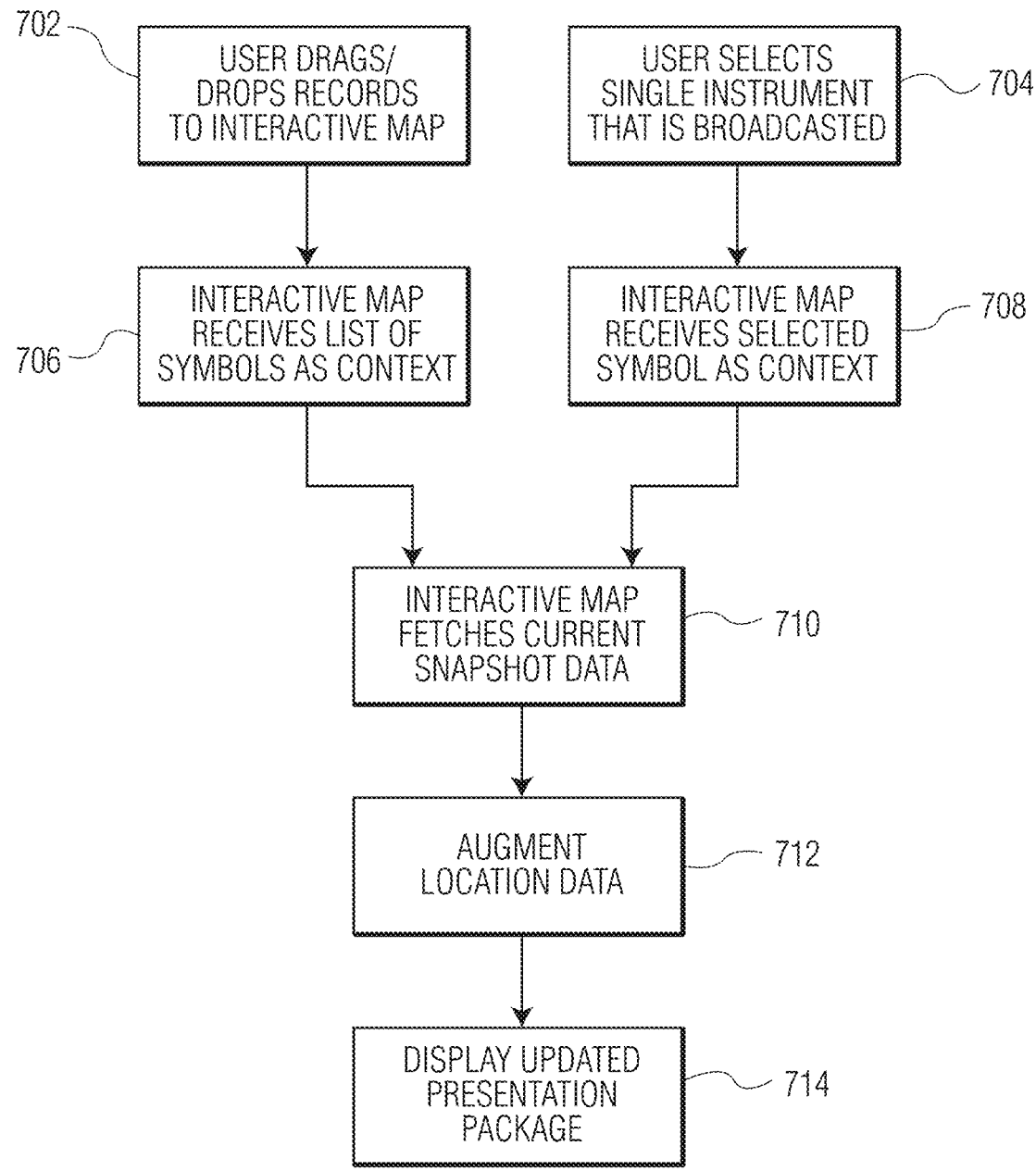
FIG. 7 is a flowchart illustrating an example of the interactive map interface serving as a receiver, according to an aspect of the present disclosure.

Referring now to FIG. 7, a flowchart illustrating an example of the interactive map interface 122 serving as a receiver is shown. At step 702, a user may drag and drop records to the interactive map interface 122 from another application/widget and at step 706 the interactive map interface 122 may receive a list of symbols as context. Alternative, at step 704 the user may select a single instrument that is broadcasted and at step 708 the interactive map interface 122 may receive the selected symbol as context.

At step 710, the interactive GUI 120 may fetch current snapshot data from the gateway server 118. As described above, the gateway server 118 may receive data from one or more backend servers (e.g., the data feed distributor 114) and may normalize the data prior to transmission to the interactive GUI 120. At step 712, the interactive GUI 120 may augment location data in the current snapshot data with one or more normalized polygons received from the polygon support system 116 (via the application server 119) and generate an augmented presented package. At step 714, the augmented presentation package may be displayed in the interactive map interface 122.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 8:
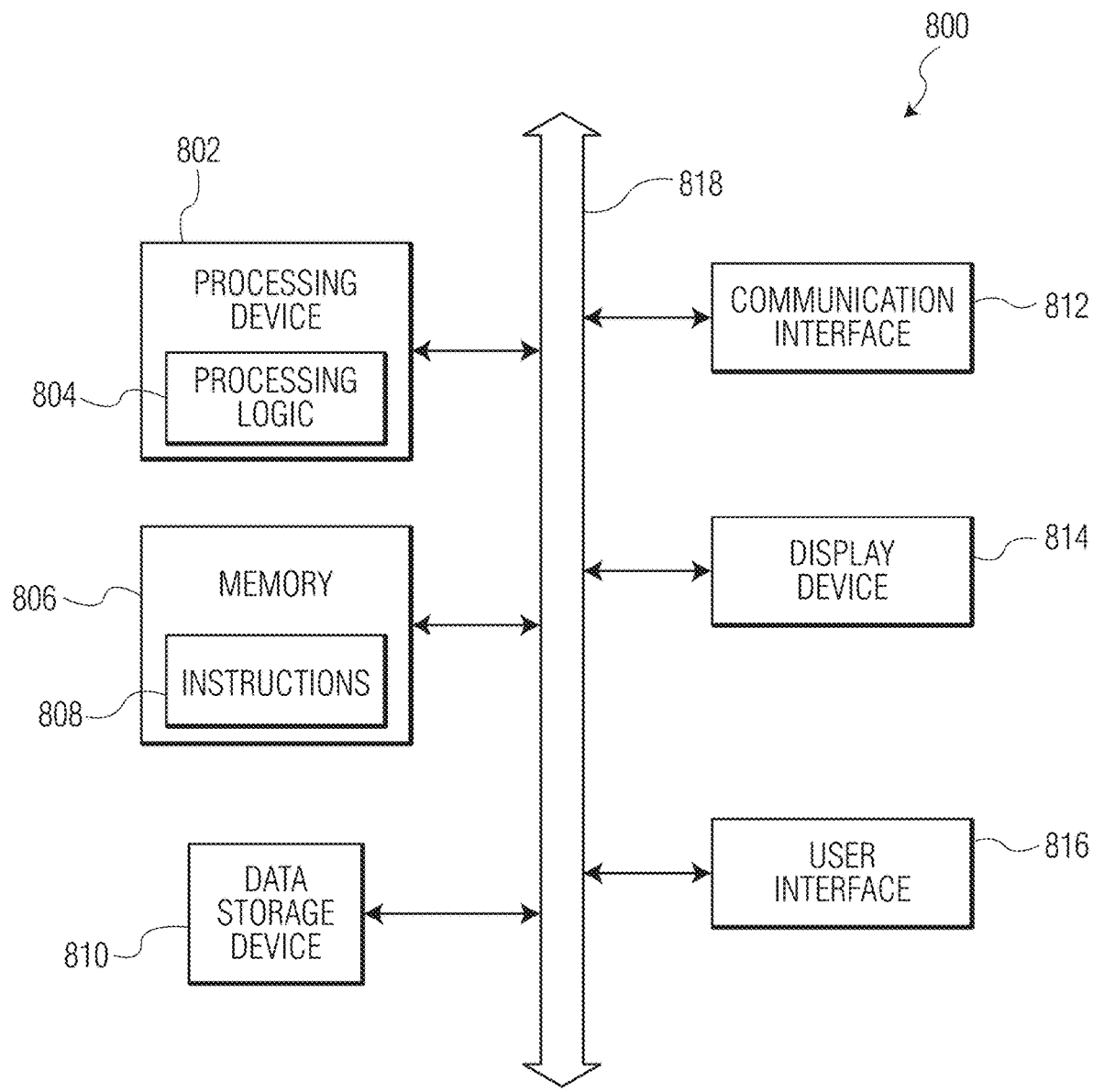
FIG. 8 is a functional block diagram of an example computer system, according to an aspect of the present disclosure.

Referring now to FIG. 8, a functional block diagram of a machine in the example form of computer system 800 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more of components 112-128 of DID system 102, location data source(s) 104, market data source(s) 106 and/or user device(s) 108 may be implemented by a specialized machine, particularly programmed to perform certain functions, such as the example machine shown in FIG. 8 (or a combination of two or more of such machines).

The example computer system 800 may include processing device 802, memory 806, data storage device 810 and communication interface 812, which may communicate with each other via data and control bus 818. In some examples, computer system 800 may also include display device 814 and/or user interface 816.

Display device 814 may be any known display technology, including but not limited to display devices using Liquid Crystal Display (LCD) or Light Emitting Diode (LED) technology.

The processing device 802 may use any known processor technology, including but not limited to graphics processors and multi-core processors. The processing device 802 may include, without being limited to, a microprocessor, a central processing unit, an application-specific integrated circuit (ASIC), a field programmable gate array (FPGA), a digital signal processor (DSP) and/or a network processor. The processing device 802 may be configured to execute processing logic 804 for performing the operations described herein. The processing device 802 may include a special-purpose processing device specially programmed with processing logic 804 to perform the operations described herein.

The memory 806 may include, for example, without being limited to, at least one of a read-only memory (ROM), a random access memory (RAM), a flash memory, a dynamic RAM (DRAM) and a static RAM (SRAM), storing computer-readable instructions 808 executable by processing device 802. The memory 806 may include a non-transitory computer readable storage medium storing computer-readable instructions 808 executable by processing device 802 for performing the operations described herein. For example, the computer-readable instructions 808 may include operations performed by components 112-128 of DID system 102. Although one memory 806 is illustrated in FIG. 8, in some examples, computer system 800 may include two or more memory devices (e.g., dynamic memory and static memory).

The user interface 816 may be any known input device technology, including but not limited to a keyboard (including a virtual keyboard), mouse, track ball, camera, and touch-sensitive pad or display.

The data and control bus 818 may be any known internal or external bus technology, including but not limited to industry standard architecture (ISA), extended ISA (EISA), peripheral component interconnect (PCI), PCI Express, universal serial bus (USB), Serial advanced technology attachment (ATA) or FireWire.

The computer system 800 may include communication interface 812, for direct communication with other computers (including wired and/or wireless communication) and/or for communication with a network. In some examples, computer system 800 may include display device 814 (e.g., a liquid crystal display (LCD), a touch sensitive display, etc.).

In some examples, the computer system 800 may include data storage device 810 storing instructions (e.g., software) for performing any one or more of the functions described herein. Data storage device 810 may include a non-transitory computer-readable storage medium, including, without being limited to, solid-state memories, optical media and magnetic media.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

The methods described herein, including those with reference to one or more flowcharts, may be performed by a controller and/or processing device (e.g., smartphone, computer, etc.). The methods may include one or more operations, functions, or actions as illustrated in one or more of blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation. Dashed lines may represent optional and/or alternative steps.

Additional examples of the presently described method and device embodiments are suggested according to the structures and techniques described herein. Other non-limiting examples may be configured to operate separately or may be combined in any permutation or combination with any one or more of the other examples provided above or throughout the present disclosure. Components and/or arrangement of components illustrated in one figure may be incorporated into any other figure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

It will be appreciated by those skilled in the art that the present disclosure may be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The terms "including" and "comprising" should be interpreted as meaning "including, but not limited to." If not already set forth explicitly in the claims, the term "a" should be interpreted as "at least one" and the terms "the, said, etc." should be interpreted as "the at least one, said at least one, etc."

The present disclosure is described with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may be executed substantially concurrently or the blocks may sometimes be executed in the reverse order, depending upon the functionality/acts involved.

For the purposes of this disclosure a non-transitory computer readable medium (or computer-readable storage medium/media) stores computer data, which data may include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which may be used to tangibly store the desired information or data or instructions and which may be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

It is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method comprising:
    generating, by a data distribution system comprising a processing device and a memory storing computer-readable instructions, an initial presentation package comprising one or more instruments;
    transmitting, by the data distribution system, the initial presentation package to an interactive graphical user interface (GUI) comprising at least a watchlist in a first window and an interactive map interface in a second window, the first window and the second window displayed on a single screen;
    displaying, by the interactive GUI, the initial presentation package in the first window, such that the one or more instruments are shown in the watchlist;
    receiving, by the interactive GUI, user input comprising a selection of an instrument from the one or more instruments, a dragging of the instrument across the single screen, and a dropping of the instrument into the interactive map interface;
    retrieving, by the data distribution system, normalized location data associated with the instrument from a data cache, the normalized location data comprising a standardized format;
    matching, by the data distribution system, the normalized location data with a normalized location identifier of a polygon stored in a database, the normalized location identifier comprising the standardized format;
    generating, by the interactive GUI, an augmented presentation package comprising the polygon;
    displaying, by the interactive GUI, the augmented presentation package in the second window, such that the polygon is presented on the interactive map interface; and
    automatically updating, by the interactive GUI, the augmented presentation package in real-time based on real-time updates of one or more of the instrument and the normalized location data.

2. The method of claim 1, further comprising:
    receiving, by the data distribution system, market data and associated location data that are updated in real-time from one or more data feeds via a network, the market data associated with the one or more instruments, the associated location data having a plurality of formats.

3. The method of claim 2, wherein the market data is received from a first data feed and the associated location data is received from a second data feed.

4. The method of claim 2, further comprising:
    converting, by the data distribution system, the plurality of formats of the location data into the standardized format to form normalized data including the normalized location data associated with the instrument.

5. The method of claim 1, further comprising:
    receiving, by the data distribution system, polygons including said polygon from one or more polygon sources via a network, the polygons comprising associated location identifiers having a plurality of formats.

6. The method of claim 5, further comprising:
    converting, by the data distribution system, the plurality of formats of the location identifiers into the standardized format to form normalized identifiers including the normalized location identifier of the polygon.

7. The method of claim 1, wherein the polygon comprises latitude-longitude points configured to be rendered on the interactive map interface.

8. The method of claim 1, wherein the polygon comprises one or more of dots, clusters, a series of connected dots, a series of separated dots, a line, a series of connected lines, a series of separated lines, shapes, and icons.

9. The method of claim 1, further comprising:
    updating, by the interactive GUI, the initial presentation package in real-time based on real-time updates of one or more of the instrument and the normalized location data.

10. The method of claim 1, further comprising:
    receiving, by the interactive GUI, user input comprising a selection of the polygon; and
    displaying, by the interactive GUI, information associated with the instrument represented by the polygon in a pop-up window in the interactive map interface.

11. A data distribution system comprising:
    a processing device operatively coupled to a memory storing computer-readable instructions that, when executed by the processing device, cause the processing device to:
    generate an initial presentation package comprising one or more instruments;
    transmit the initial presentation package to an interactive graphical user interface (GUI) comprising at least a watchlist in a first window and an interactive map interface in a second window, the first window and the second window displayed on a single screen;
    display, by the interactive GUI, the initial presentation package in the first window, such that the one or more instruments are shown in the watchlist;
    receive, by the interactive GUI, user input comprising a selection of an instrument from the one or more instruments, a dragging of the instrument across the single screen, and a dropping of the instrument into the interactive map interface;
    retrieve normalized location data associated with the instrument from a data cache, the normalized location data comprising a standardized format;
    match the normalized location data with a normalized location identifier of a polygon stored in a database, the normalized location identifier comprising the standardized format;
    generate, by the interactive GUI, an augmented presentation package comprising the polygon;
    display, by the interactive GUI, the augmented presentation package in the second window, such that the polygon is presented on the interactive map interface; and
    automatically update, by the interactive GUI, the augmented presentation package in real-time based on real-time updates of one or more of the instrument and the normalized location data.

12. The system of claim 11, wherein the processing device is further configured to:
receive market data and associated location data that are updated in real-time from one or more data feeds via a network, the market data associated with the one or more instruments, the associated location data having a plurality of formats.

13. The system of claim 12, wherein the market data is received from a first data feed and the associated location data is received from a second data feed.

14. The system of claim 12, wherein the processing device is further configured to:
convert the plurality of formats of the location data into the standardized format to form normalized data including the normalized location data associated with the instrument.

15. The system of claim 11, wherein the processing device is further configured to:
receive polygons including said polygon from one or more polygon sources via a network, the polygons comprising associated location identifiers having a plurality of formats.

16. The system of claim 15, wherein the processing device is further configured to:
convert the plurality of formats of the location identifiers into the standardized format to form normalized identifiers including the normalized location identifier of the polygon.

17. The system of claim 11, wherein the polygon comprises latitude-longitude points configured to be rendered on the interactive map interface.

18. The system of claim 11, wherein the polygon comprises one or more of dots, clusters, a series of connected dots, a series of separated dots, a line, a series of connected lines, a series of separated lines, shapes, and icons.

19. The system of claim 11, wherein the processing device is further configured to:
update, by the interactive GUI, the initial presentation package in real-time based on real-time updates of one or more of the instrument and the normalized location data.

20. The system of claim 11, wherein the processing device is further configured to:
receive, by the interactive GUI, user input comprising a selection of the polygon; and
display, by the interactive GUI, information associated with the instrument represented by the polygon in a pop-up window in the interactive map interface.

21. A non-transitory computer readable storage medium storing one or programs comprising computer-readable instructions that, when executed by a processing device of a data distribution system, cause the processing device to:
generate an initial presentation package comprising one or more instruments;
transmit the initial presentation package to an interactive graphical user interface (GUI) comprising at least a watchlist in a first window and an interactive map interface in a second window, the first window and the second window displayed on a single screen;
display, by the interactive GUI, the initial presentation package in the first window, such that the one or more instruments are shown in the watchlist;
receive, by the interactive GUI, user input comprising a selection of an instrument from the one or more instruments, a dragging of the instrument across the single screen, and a dropping of the instrument into the interactive map interface;
retrieve normalized location data associated with the instrument from a data cache, the normalized location data comprising a standardized format;
match the normalized location data with a normalized location identifier of a polygon stored in a database, the normalized location identifier comprising the standardized format;
generate, by the interactive GUI, an augmented presentation package comprising the polygon;
display, by the interactive GUI, the augmented presentation package in the second window, such that the polygon is presented on the interactive map interface; and
automatically update, by the interactive GUI, the augmented presentation package in real-time based on real-time updates of one or more of the instrument and the normalized location data.

22. The non-transitory computer readable storage medium of claim 21, wherein the computer-readable instructions, when executed by the processing device, further cause the processing device to:
receive market data and associated location data that are updated in real-time from one or more data feeds via a network, the market data associated with the one or more instruments, the associated location data having a plurality of formats.

23. The non-transitory computer readable storage medium of claim 22, wherein the market data is received from a first data feed and the associated location data is received from a second data feed.

24. The non-transitory computer readable storage medium of claim 22, wherein the computer-readable instructions, when executed by the processing device, further cause the processing device to:
convert the plurality of formats of the location data into the standardized format to form normalized data including the normalized location data associated with the instrument.

25. The non-transitory computer readable storage medium of claim 21, wherein the computer-readable instructions, when executed by the processing device, further cause the processing device to:
receive polygons including said polygon from one or more polygon sources via a network, the polygons comprising associated location identifiers having a plurality of formats.

26. The non-transitory computer readable storage medium of claim 25, wherein the computer-readable instructions, when executed by the processing device, further cause the processing device to:
convert the plurality of formats of the location identifiers into the standardized format to form normalized identifiers including the normalized location identifier of the polygon.

27. The non-transitory computer readable storage medium of claim 21, wherein the polygon comprises latitude-longitude points configured to be rendered on the interactive map interface.

28. The non-transitory computer readable storage medium of claim 21, wherein the polygon comprises one or more of dots, clusters, a series of connected dots, a series of separated dots, a line, a series of connected lines, a series of separated lines, shapes, and icons.

29. The non-transitory computer readable storage medium of claim 21, wherein the computer-readable instructions, when executed by the processing device, further cause the processing device to:

update, by the interactive GUI, the initial presentation package in real-time based on real-time updates of one or more of the instrument and the normalized location data.

30. The non-transitory computer readable storage medium of claim 21, wherein the computer-readable instructions, when executed by the processing device, further cause the processing device to:
   receive, by the interactive GUI, user input comprising a selection of the polygon; and
   display, by the interactive GUI, information associated with the instrument represented by the polygon in a pop-up window in the interactive map interface.

\* \* \* \* \*